(12) United States Patent
Ma

(10) Patent No.: US 11,432,355 B2
(45) Date of Patent: Aug. 30, 2022

(54) CONTROL PLANE CONNECTION MANAGEMENT METHOD AND APPARATUS

(71) Applicant: HUAWEI TECHNOLOGIES CO.,LTD., Guangdong (CN)

(72) Inventor: Jingwang Ma, Shanghai (CN)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 102 days.

(21) Appl. No.: 16/573,942

(22) Filed: Sep. 17, 2019

(65) Prior Publication Data

US 2020/0015304 A1 Jan. 9, 2020

Related U.S. Application Data

(63) Continuation of application No. PCT/CN2017/077394, filed on Mar. 20, 2017.

(51) Int. Cl.
*H04W 76/15* (2018.01)
*H04W 72/08* (2009.01)
(Continued)

(52) U.S. Cl.
CPC ............ *H04W 76/15* (2018.02); *H04W 8/02* (2013.01); *H04W 72/087* (2013.01); *H04W 76/30* (2018.02); *H04W 88/16* (2013.01)

(58) Field of Classification Search
CPC ....... H04W 76/15; H04W 76/30; H04W 8/02; H04W 72/087; H04W 88/16
See application file for complete search history.

(56) References Cited

U.S. PATENT DOCUMENTS

2010/0130171 A1  5/2010  Palanigounder et al.
2017/0019930 A1  1/2017  Lee et al.
(Continued)

FOREIGN PATENT DOCUMENTS

CN   1968501 A    5/2007
CN   106162635 A  11/2016
(Continued)

OTHER PUBLICATIONS

3GPP TS 23.502 V0.2.0; 3rd Generation Partnership Project; Technical Specification Group Services and System Aspects; Procedures for the 5G System; Stage 2(Release 15); Feb. 2017; total 71 pages.
(Continued)

*Primary Examiner* — Luat Phung

(57) ABSTRACT

In a control plane connection management method, a core network function entity determines, based on a service requirement of a service, information about a first connection requirement for a control plane connection of a terminal. The first connection requirement is for activating the control plane connection between the terminal and an access and mobility management function entity. The core network entity constructs a first control plane requirement message that contains identifier information of the terminal and the information about the first connection requirement. The core network entity then sends the first control plane requirement message to the access and mobility management function entity to instruct the access and mobility management function entity to activate the control plane connection of the terminal.

19 Claims, 8 Drawing Sheets

(51) Int. Cl.
H04W 76/30 (2018.01)
H04W 8/02 (2009.01)
H04W 88/16 (2009.01)

(56) References Cited

U.S. PATENT DOCUMENTS

2018/0227871 A1* 8/2018 Singh .................. H04W 12/068
2018/0352448 A1* 12/2018 Ryu ......................... H04W 8/04
2020/0100101 A1* 3/2020 Torvinen ............. H04W 12/106

FOREIGN PATENT DOCUMENTS

RU          2476029 C2   2/2013
WO          2009056025 A1  5/2009
WO          2016155478 A1  10/2016

OTHER PUBLICATIONS

LG Electronics, Nokia et al.,"23.502 §4.3 4: PDU session release procedure",SA WG2 Meeting #119 S2-170770 (revision of S2-170239),Feb. 13-17, 2017, Dubrovnik, Croatia,total 5 pages.
3GPP TS 23.040 V14.0.0; 3rd Generation Partnership Project; Technical Specification Group Core Network and Terminals; Technical realization of the Short Message Service (SMS); (Release 14); Mar. 2017; total 214 pages.
3GPP TS 23.501 V0.1.0 (Jan. 2017);3rd Generation Partnership Project;Technical Specification Group Services and System Aspects-;System Architecture for the 5G System;Stage 2(Release 15);total 65 pages.
3GPP TS 23.501 V0.3.1; 3rd Generation Partnership Project; Technical Specification Group Services and System Aspects; System Architecture for the 5G System; Stage 2(Release 15); Mar. 2017; total 97 pages.
S2-170042; China Mobile, ATandT; 23.501: Service definition of the network functions; Agenda ltem:6 5.11; SA WG2 Meeting #118bis; Jan. 16-20, 2017, Spokane, WA, USA; total 4 pages.
S2-170043; China Mobile, ATandT, Huawei; 23.502: Service definition and applies to PDU Session Establishment Agenda ltem:6. 5.3; SA WG2 Meeting #118-BIS; Jan. 16-20, 2017 ,Spokane, WA, USA; total 11 pages.
Huawei et al.,"Interim agreements on asynchronous session management",SA WG2 Meeting S2#117 S2-166440,Nov. 14-18, 2016, Reno, Nevada, USA,total 6 pages.
S2-170212,Huawei, HiSilicon, "Session Connection State Management",SA WG2 Meeting #118 Bis Jan. 16-20, 2017, Spokane, Washington, USA,total 5 pages.

* cited by examiner

CONTROL PLANE CONNECTION MANAGEMENT METHOD AND APPARATUS

CROSS-REFERENCE TO RELATED APPLICATIONS

This application is a continuation of International Application No. PCT/CN2017/077394, filed on Mar. 20, 2017, which is hereby incorporated by reference in its entirety.

TECHNICAL FIELD

Embodiments of the present application relate to communications technologies, and in particular, to manage a control plane connection of a terminal.

BACKGROUND

A network element (NE) architecture is used in an evolved packet core (EPC). Typical NEs in the architecture include a mobility management entity (MME), a serving gateway (S-GW), a packet data network gateway (P-GW), and the like. Currently, network functions (such as mobility management, bearer management, and location management) of the EPC are implemented by using a service feature and processing logic that are fixed in an NE, and a procedure message between NEs. For example, an access service of a user requires collaboration between the MME, the S-GW, the P-GW, and another NE (for example, a policy and charging rules function (PCRF) unit or a home subscriber server (HSS) in the network and is completed by using a service procedure and logic defined by a standard. Therefore, currently, a feature of a network function (NF) service that can be provided by the EPC is fixed.

With continuous expansion of business modes and continuous development of technologies, a service requirement of the user correspondingly changes. A service of the user requires more service modes and better service features, for example, a requirement for ultra-low-delay communication and a requirement for high-reliability communication, thereby bringing about a requirement for a new NF. However, NF services provided by the EPC are fixed and are scattered in NEs. Therefore, if a new N F needs to be introduced to satisfy a requirement of the user, processing logic and procedure interaction of the NEs need to be redefined and redesigned for the EPC. Such a redesign means a long development period and high costs for an equipment vendor, and means, for a network operator, that a new network service cannot be released in time.

SUMMARY

Embodiments of the present application provide a control plane connection management method and an apparatus, to improve flexibility of a network structure.

According to a first aspect, an embodiment of the present application provides a control plane connection management method, including:

determining, by a core network function component, information about a requirement of the core network function component for a control plane connection of a terminal; and sending, by the core network function component, a control plane requirement message to an access and mobility management function component, where the control plane requirement message includes identifier information of the terminal and the information about the requirement of the core network function component for the control plane connection of the terminal, and the control plane requirement message is used for instructing the access and mobility management function component to process the control plane connection of the terminal.

With reference to the first aspect, in a possible implementation of the first aspect, the information about the requirement of the core network function component for the control plane connection of the terminal includes any one of information about keeping the control plane connection in a connected state, information about allowing the terminal to initiate release of the control plane connection, control plane connection activation information, control plane connection deactivation information, and information about a requirement for releasing the control plane connection.

With reference to the first aspect or the foregoing possible implementation of the first aspect, in another possible implementation of the first aspect, the determining, by a core network function component, information about a requirement of the core network function component for a control plane connection of a terminal includes:

determining, by the core network function component, the information about the requirement of the core network function component for the control plane connection of the terminal based on a service requirement; or obtaining, by the core network function component, a type of a session connection of the terminal, and determining the information about the requirement of the core network function component for the control plane connection of the terminal based on the type of the session connection.

With reference to the first aspect or the foregoing possible implementation of the first aspect, in another possible implementation of the first aspect, the core network function component includes a session management function component, and the determining, by the core network function component, the information about the requirement of the core network function component for the control plane connection of the terminal based on the type of the session connection includes:

if the type of the session connection is an industrial control type, determining, by the session management function component, that the information about the requirement of the session management function component for the control plane connection of the terminal is the information about keeping the control plane connection in the connected state; or if the type of the session connection is an Internet access type, determining, by the session management function component, that the information about the requirement of the session management function component for the control plane connection of the terminal is the information about allowing the terminal to initiate release of the control plane connection.

With reference to the first aspect or the foregoing possible implementation of the first aspect, in another possible implementation of the first aspect, the core network function component includes a session management function component, and the determining, by the core network function component, the information about the requirement of the core network function component for the control plane connection of the terminal based on a service requirement includes:

when the session management function component needs to send downlink data to the terminal, if a connection status of the session connection of the terminal is an idle state, determining, by the session management function component, that the information about the requirement of the session management function component for the control plane connection of the terminal is the control plane connection activation information.

With reference to the first aspect or the foregoing possible implementation of the first aspect, in another possible implementation of the first aspect, the core network function component includes a session management function component, and the determining, by the core network function component, the information about the requirement of the core network function component for the control plane connection of the terminal based on a service requirement includes:

if a connection status of the session connection of the terminal is a connected state, and the session management function component determines that no data is transmitted by using the session connection within preset duration, determining, by the session management function component, that the information about the requirement of the session management function component for the control plane connection of the terminal is the control plane connection deactivation information.

With reference to the first aspect or the foregoing possible implementation of the first aspect, in another possible implementation of the first aspect, the core network function component includes a session management function component, and the determining, by the core network function component, the information about the requirement of the core network function component for the control plane connection of the terminal based on the type of the session connection includes:

after the session connection is released, determining, by the session management function component, that the information about the requirement of the session management function component for the control plane connection of the terminal is the information about the requirement for releasing the control plane connection.

With reference to the first aspect or the foregoing possible implementation of the first aspect, in another possible implementation of the first aspect, the determining, by the core network function component, the information about the requirement of the core network function component for the control plane connection of the terminal based on a service requirement includes:

when the core network function component needs to send a signaling message to the terminal, determining, by the core network function component, that the information about the requirement of the core network function component for the control plane connection of the terminal is the control plane connection activation information.

With reference to the first aspect or the foregoing possible implementation of the first aspect, in another possible implementation of the first aspect, the determining, by the core network function component, the information about the requirement of the core network function component for the control plane connection of the terminal based on a service requirement includes:

when the core network function component has completed service processing on the terminal, determining, by the core network function component, that the information about the requirement of the core network function component for the control plane connection of the terminal is the information about the requirement for releasing the control plane connection.

According to a second aspect, an embodiment of the present application provides a control plane connection management method, including:

receiving, by an access and mobility management function component, a control plane requirement message sent by a core network function component, where the control plane requirement message includes identifier information of a terminal and information about a requirement of the core network function component for a control plane connection of the terminal; and processing, by the access and mobility management function component, the control plane connection of the terminal based on the information about the requirement of the core network function component for the control plane connection of the terminal.

With reference to the second aspect, in a possible implementation of the second aspect, the information about the requirement of the core network function component for the control plane connection of the terminal includes any one of information about keeping the control plane connection in a connected state, information about allowing the terminal to initiate release of the control plane connection, control plane connection activation information, control plane connection deactivation information, and information about a requirement for releasing the control plane connection.

With reference to the second aspect or the foregoing possible implementation of the second aspect, in another possible implementation of the second aspect, the core network function component includes a plurality of core network function components, and the receiving, by an access and mobility management function component, a control plane requirement message sent by a core network function component includes:

separately receiving, by the access and mobility management function component, control plane requirement messages sent by the plurality of core network function components; and the processing, by the access and mobility management function component, a control plane of the terminal based on the information about the requirement of the core network function component for the control plane connection of the terminal includes:

determining, by the access and mobility management function component, control plane connection control policy information of the terminal based on priorities of information about requirements of the plurality of core network function components for the control plane connection of the terminal; and processing, by the access and mobility management function component, the control plane connection of the terminal based on the control plane connection control policy information.

With reference to the second aspect or the foregoing possible implementation of the second aspect, in another possible implementation of the second aspect, priorities corresponding to the information about keeping the control plane connection in the connected state, the information about allowing the terminal to initiate release of the control plane connection, the control plane connection activation information, the control plane connection deactivation information, and the information about the requirement for releasing the control plane connection are in descending order.

With reference to the second aspect or the foregoing possible implementation of the second aspect, in another possible implementation of the second aspect, if the control plane connection control policy information is indication information of keeping the control plane connection in the connected state, the processing, by the access and mobility management function component, the control plane connection of the terminal based on the control plane connection control policy information includes:

sending, by the access and mobility management function component, the indication information of keeping the control plane connection in the connected state to the terminal by using an access network device.

With reference to the second aspect or the foregoing possible implementation of the second aspect, in another possible implementation of the second aspect, if the control plane connection control policy information is indication information of allowing the terminal to initiate release of the control plane connection, the processing, by the access and mobility management function component, the control plane connection of the terminal based on the control plane connection control policy information includes:

sending, by the access and mobility management function component, the indication information of allowing the terminal to initiate release of the control plane connection to the terminal and an access network device serving the terminal, where the indication information of allowing the terminal to initiate release of the control plane connection is used for indicating that the terminal is allowed to initiate release of the control plane connection of the terminal.

With reference to the second aspect or the foregoing possible implementation of the second aspect, in another possible implementation of the second aspect, if the control plane connection control policy information is control plane connection activation indication information, the processing, by the access and mobility management function component, the control plane connection of the terminal based on the control plane connection control policy information includes:

executing, by the access and mobility management function component based on the control plane connection activation indication information, a procedure of activating the control plane connection of the terminal.

With reference to the second aspect or the foregoing possible implementation of the second aspect, in another possible implementation of the second aspect, if the control plane connection control policy information is control plane connection deactivation indication information, the processing, by the access and mobility management function component, the control plane connection of the terminal based on the control plane connection control policy information includes:

controlling, by the access and mobility management function component based on the control plane connection deactivation indication information, the control plane connection of the terminal to enter an idle state.

With reference to the second aspect or the foregoing possible implementation of the second aspect, in another possible implementation of the second aspect, if the control plane connection control policy information is indication information of the requirement for releasing the control plane connection, the processing, by the access and mobility management function component, the control plane connection of the terminal based on the control plane connection control policy information includes:

executing, by the access and mobility management function component based on the indication information of the requirement for releasing the control plane connection, a procedure of releasing the control plane connection of the terminal.

With reference to the second aspect or the foregoing possible implementation of the second aspect, in another possible implementation of the second aspect, if the control plane connection control policy information is indication information of the requirement for releasing the control plane connection, the processing, by the access and mobility management function component, the control plane connection of the terminal based on the control plane connection control policy information includes:

deleting, by the access and mobility management function component, a correspondence between the identifier information of the terminal, an identifier of a session connection, and an identifier of the core network function component.

With reference to the second aspect or the foregoing possible implementation of the second aspect, in another possible implementation of the second aspect, if the control plane connection control policy information changes, the method further includes:

sending, by the access and mobility management function component, changed control plane connection control policy information to the terminal by using an access network.

With reference to the second aspect or the foregoing possible implementation of the second aspect, in another possible implementation of the second aspect, if the control plane connection control policy information is control plane connection activation indication information, the processing, by the access and mobility management function component, the control plane connection of the terminal based on the control plane connection control policy information includes:

storing, by the access and mobility management function component, a correspondence between the identifier information of the terminal, an identifier of the core network function component, and an identifier of a service connection between the terminal and the core network function component.

With reference to the second aspect or the foregoing possible implementation of the second aspect, in another possible implementation of the second aspect, the method further includes:

sending, by the access and mobility management function component, the identifier of the service connection to the terminal; and after receiving a message sent by the terminal to the core network function component and the identifier of the service connection, determining, by the access and mobility management function component, a corresponding core network function component based on the identifier information of the terminal and the identifier of the service connection, and sending the message to the core network function component.

With reference to the second aspect or the foregoing possible implementation of the second aspect, in another possible implementation of the second aspect, if the control plane connection control policy information is indication information of the requirement for releasing the control plane connection, the processing, by the access and mobility management function component, the control plane connection of the terminal based on the control plane connection control policy information includes:

deleting, by the access and mobility management function component, a correspondence between the identifier information of the terminal, an identifier of the core network function component, and an identifier of a service connection between the terminal and the core network function component.

According to a third aspect, an embodiment of the present application provides a core network function component, and the core network function component has a function of implementing a behavior of the core network function component in the foregoing method embodiment. The function may be implemented by using hardware, or may be implemented by hardware executing corresponding software. The hardware or software includes one or more modules corresponding to the foregoing function.

According to a fourth aspect, an embodiment of the present application provides a core network function component, including a processor, a memory, a bus, and a communications interface. The memory is configured to store a computer executable instruction. The processor is connected to the memory by using the bus. When the core network function component runs, the processor executes the computer executable instruction stored in the memory, so that the core network function component performs the control plane connection management method in any possible implementation of the first aspect.

According to a fifth aspect, an embodiment of the present application provides a computer readable storage medium, configured to store a computer software instruction used by the core network function component. When the computer software instruction is run on a computer, the computer is enabled to perform the control plane connection management method in any possible implementation of the first aspect.

According to a sixth aspect, an embodiment of the present application provides a computer program product including an instruction. When the computer program product is run on a computer, the computer is enabled to perform the control plane connection management method in any possible implementation of the first aspect.

In addition, for a technical effect brought by any design manner in the third aspect to the sixth aspect, refer to the technical effects brought by the different design manners in the first aspect. Details are not described herein again.

According to a seventh aspect, an embodiment of the present application provides an access and mobility management function component, and the access and mobility management function component has a function of implementing a behavior of the access and mobility management function component in the foregoing method embodiment. The function may be implemented by using hardware, or may be implemented by hardware executing corresponding software. The hardware or software includes one or more modules corresponding to the foregoing function.

According to an eighth aspect, an embodiment of the present application provides an access and mobility management function component, including a processor, a memory, a bus, and a communications interface. The memory is configured to store a computer executable instruction. The processor is connected to the memory by using the bus. When the access and mobility management function component runs, the processor executes the computer executable instruction stored in the memory, so that the access and mobility management function component performs the control plane connection management method in any possible implementation of the second aspect.

According to a ninth aspect, an embodiment of the present application provides a computer readable storage medium, configured to store a computer software instruction used by the access and mobility management function component. When the computer software instruction is run on a computer, the computer is enabled to perform the control plane connection management method in any possible implementation of the second aspect.

According to a tenth aspect, an embodiment of the present application provides a computer program product including an instruction. When the computer program product is run on a computer, the computer is enabled to perform the control plane connection management method in any possible implementation of the second aspect.

In addition, for a technical effect brought by any design manner in the seventh aspect to the tenth aspect, refer to the technical effects brought by the different design manners in the second aspect. Details are not described herein again.

According to an eleventh aspect, an embodiment of the present application provides a communications system, including the core network function component in the third aspect and the access and mobility management function component in the seventh aspect.

In addition, for a technical effect brought by the eleventh aspect, refer to the technical effects brought by the different design manners in the first aspect and the second aspect. Details are not described herein again.

According to the control plane connection management method and the apparatus in the embodiments of the present application, network functions originally fixed and scattered in an MME, an S-GW, and a P-GW are separated into a session management function SMF NF, an access and mobility management function AMF NF, a policy control function PCF NF, and the like. The core network function component including a session management function SMF NF component or the policy control function PCF NF sends a control plane requirement message to an access and mobility management function AMF NF component; and the access and mobility management function AMF NF component processes, based on control plane connection requirement information, a control plane connection used by a terminal, so that a function component inside a core network notifies the access and mobility management function AMF NF component of a requirement for the control plane connection, and the access and mobility management function AMF NF component controls the control plane connection of the terminal based on the requirement, thereby effectively improving flexibility of a network structure while satisfying a network function need.

DESCRIPTION OF EMBODIMENTS

In embodiments of the present application, an NE (such as an MME or an S-GW) in a core network part of an architecture of a communications network is divided into different NF components based on categories of functions, for example, an authentication and security function, a session management function, an access and mobility management function, and an access control function. Corresponding NF components implement these functions, and implement decoupling of related functions. A separate NF component may interact with another NF by using an interface supported by the separate NF component, to complete a plurality of network services.

Figure 1:
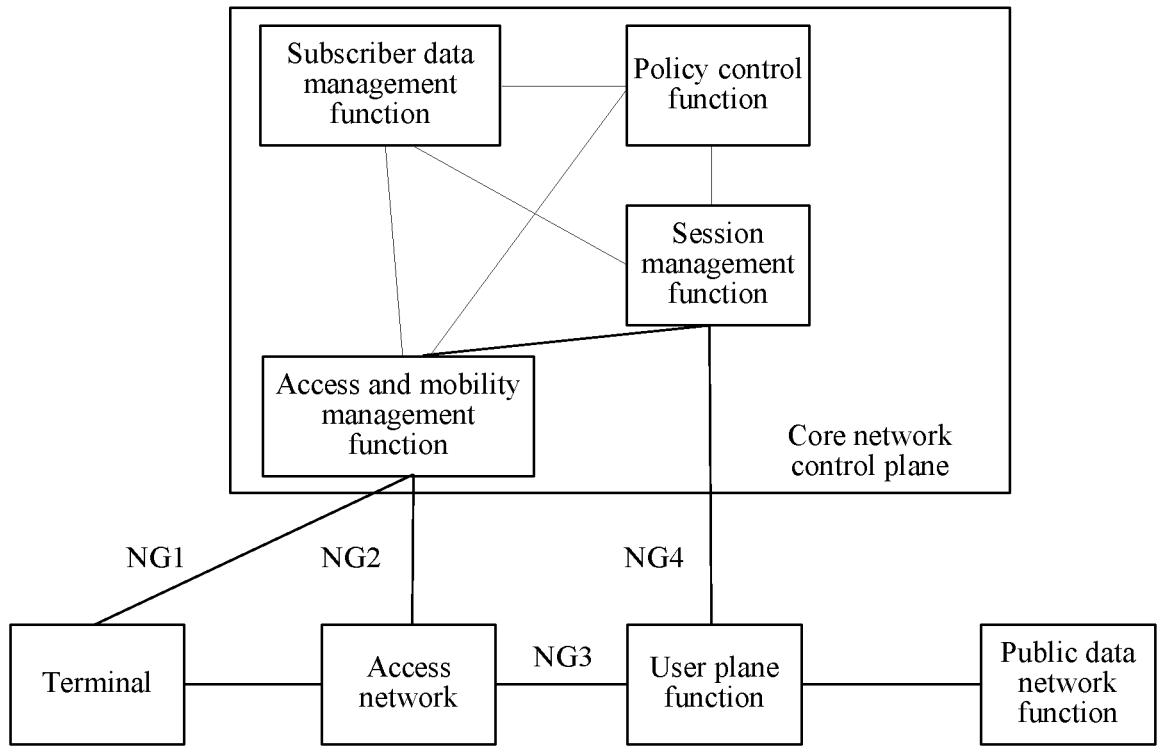
FIG. 1 is a schematic diagram of a network architecture according to an embodiment of the present application.

FIG. 1 is a schematic diagram of a network architecture according to an embodiment of the present application. As shown in FIG. 1, the network architecture specifically includes a terminal, an access network (AN), a user plane (UP) function, a public data network (DN) function, and a core network control plane (CN control plane). The AN may specifically include a wired access network and a radio access network (RAN). The CN control plane may specifically include an access and mobility management function (Access and Mobility Management Function, AMF NF) component, a session management function (SMF NF) component, a policy control function (PCF NF) component, and a subscriber data management function (Subscriber Data NF) component.

Network functions NFs in the network architecture in this embodiment of the present application may all be implemented by using a network function virtualization (NFV) technology. Certainly, it may be understood that, the core network control plane in the network architecture shown in FIG. 1 further includes another network function. This is not described herein.

The terminal provided in this embodiment of the present application specifically refers to a device that provides voice and/or data connectivity to a user, including a wireless terminal or a wired terminal. The wireless terminal may be a handheld device having a wireless connection function, or another processing device connected to a wireless modem, or a mobile terminal that communicates with one or more core networks by using the radio access network. For example, the wireless terminal may be a mobile phone (or referred to as a "cellular" phone) or a computer having a mobile terminal. For another example, the wireless terminal may be a portable, a pocket-sized, a computer built-in, or an in-vehicle mobile apparatus. For still another example, the wireless terminal may be a part of a mobile station, an access point, or user equipment (UE). For the convenience of description, the following specifically describes this embodiment of the present application by using user equipment (UE) as an example.

As shown in FIG. 1, interfaces and connections in the network architecture include NG1, NG2, NG3, and NG4. NG1 is a control plane connection between the user equipment and the core network control plane, and is used to transmit control signaling between the user equipment and the core network control plane, and a message in a specific NG1 connection may be transmitted by using a connection between the UE and the AN and an NG2 connection between the AN and the core network control plane. NG2 is a control plane connection between the AN and the core network control plane, and is used to: transmit control signaling between the core network control plane and the AN, and support the NG1 connection between the UE and the core network control plane. NG3 is a connection between the AN and the user plane function, and is used to support a protocol data unit (PDU) session connection established for the user equipment. NG4 is a connection between an SMF NF and the user plane function, and is used to transmit control signaling between the SMF NF and the user plane function.

Specifically, the AMF NF may be specifically configured to: (1) manage network access of the user equipment: control over the network access of the user equipment, authorization and authentication of the user equipment, and the like; (2) manage a location of the user equipment: maintenance of an identifier of a network area in which the user equipment is located in a network, where information about the network area in which the user equipment is located is updated when the user moves; (3) manage accessibility of the user equipment: when a related message needs to be sent to the user by using the control plane connection, and when the control plane connection of the user equipment is in an idle state, the AMF NF performs an operation of paging the user equipment, so that after receiving the paging, the user equipment initiates establishment of a connection to the core network control plane; (4) manage the control plane connection (CP) of the user equipment: including establishment of the control plane connection, management of the control plane connection when the control plane connection is switched between the idle state (Idle) and a connected state (connected); and (5) transmit a message that is exchanged between the user equipment, an access network device, and a network function of the core network control plane by using the control plane connection (NG1 or NG2).

The SMF NF may be specifically configured to manage a PDU session connection, where the PDU session connection of the user equipment is a connection between the UE, the AN, the user plane (UP) function, and the public data network (DN), and the user equipment receives data and sends data to a related application server, or the like by using the established PDU session connection. The SMF NF transmits control signaling of a UP by using a control plane connection NG4 interface, transmits control signaling of the PDU session connection that is to the user equipment by using the AMF NF and the control plane connection NG1, and transmits control signaling of the PDU session connection that is to the access network device by using the AMF NF and the control plane connection NG2.

The PCF NF may be specifically configured to: as a policy control and management function, provide, to the SMF NF, policy information of the PDU session connection established by the user equipment, including configuration information of quality of service (QoS) and charging, and the like. The PCF may provide configuration information of a policy for performing access and mobility management on the user equipment to the AMF NF. The PCF may also provide configuration information of a policy for the terminal to the user equipment through control plane connection transmission provided by the AMF, thereby implementing policy control over the user equipment. The configuration information of the policy for the terminal includes a network selection policy, a session and service continuity (SSC) mode selection policy, and the like.

The Subscriber Data NF may be specifically configured to: store subscriber data of the user, and provide the subscriber data of the user to the AMF NF and the SMF NF.

A core network function component provided in this specification is a component configured to implement control plane management, and may be specifically the SMF NF or the PCF NF shown in FIG. 1. Certainly, it may be understood that, the core network function component may alternatively be another function component in a core network, or may be a capability opening network element, an SMS network element, or the like (not shown in the figure). Descriptions are not further provided by using examples one by one herein.

It should be noted that, the access and mobility management function component, the session management function component, the policy control function component, or the like in the system shown in FIG. 1 is only a name, and the name does not constitute a limitation on the device. In a 5G network in the future and another network in the future, a network element or an entity corresponding to the access and mobility management function component, the session management function component, or the policy control function component may alternatively have another name. This is not specifically limited in this embodiment of the present application. For example, the access and mobility management function component may alternatively be replaced with an access and mobility management function or an access and mobility management entity, and the session management function component may alternatively be replaced with a session management function or a session management entity. Unified description is provided herein, and details are not described in the following again.

It should be noted that, the SMF NF shown in FIG. 1 may specifically include a plurality of SMF NFs. One UE may set up sessions of a plurality of service types, such as a common Internet access type and an industrial control type, and a session of each service type may be processed by a different SMF NF. The session of each service type has a different requirement on the control plane connection. For example, a connection for a session of the industrial control type requires the control plane connection of the UE to be always in the connected state (connected), so that control signaling of the connection for the session of this type can be sent to the UE in time, and a service delay can be reduced. However, for a connection for a session used for Internet access, when no data is received and sent, the control plane connection of the UE may turn into the idle state, and the control plane connection of the UE is activated when the UE subsequently needs to send and receive data. When the control plane connection is in the idle state, a connection between the UE and the access network and an N2 connection that is between the access network and the AMF and that is used for the UE are released, thereby saving network resources that serve the UE.

Figure 2:
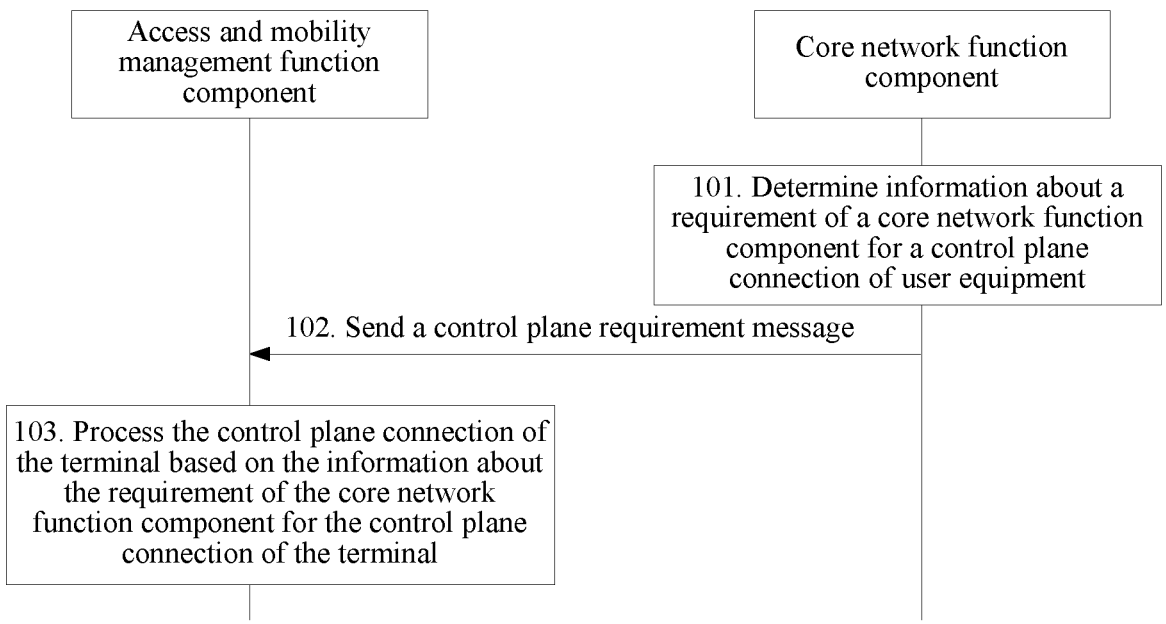
FIG. 2 is a flowchart of a control plane connection management method according to an embodiment of the present application.

Based on the network architecture shown in FIG. 1, FIG. 2 is a flowchart of a control plane connection management method according to an embodiment of the present application. As shown in FIG. 2, the method in this embodiment may include the following steps.

Step 101: A core network function component determines information about a requirement of the core network function component for a control plane connection of user equipment.

Specifically, the information about the requirement of the core network function component for the control plane connection of the user equipment may specifically include any one of information about keeping the control plane connection in a connected state (CP connection always connected), information about allowing the user equipment to initiate release of the control plane connection (allow CP connection release initiated by UE), control plane connection activation information (activate CP connection), control plane connection deactivation information (deactivate CP connection), and information about a requirement for releasing the control plane connection (release the need on CP connection).

The information about keeping the control plane connection in the connected state (CP connection always connected) is used for indicating that the control plane connection of the user equipment needs to be always in the connected state. The information about allowing the terminal to initiate release of the control plane connection (allow CP connection release initiated by UE) is used for indicating that the CP connection release initiated by the user equipment is allowed. The control plane connection activation information (activate CP connection) is used for instructing an AMF NF to control the control plane connection of the user equipment to enter the connected state. The control plane connection deactivation information (deactivate CP connection) is used for instructing a core network NF that sends control plane connection requirement information to notify the AMF that it does not require the control plane connection of the user equipment to be in the connected state. The information about the requirement for releasing the control plane connection (release the need on CP connection) is used for instructing the core network function component to release the requirement for the CP connection of the user equipment.

Step 102: The core network function component sends a control plane requirement message to an access and mobility management function component.

The access and mobility management function AMF NF component receives the control plane requirement message sent by the core network function component.

The control plane requirement message may specifically include identifier information of the terminal and the information about the requirement of the core network function component for the control plane connection of the terminal. Optionally, the control plane requirement message may further include identifier information of the core network function component. The identifier information of the core network function component is used for identifying the core network function component. Different identifier information of the core network function component corresponds to different core network function components. For example, if the core network function component is an SMF NF, identifier information of the SMF NF may be specifically a logical identifier of the SMF NF or may be a physical address of the SMF NF. Optionally, the control plane requirement message may further include an identifier of a session connection, and the like.

Step 103: The access and mobility management function component processes the control plane connection of the terminal based on the information about the requirement of the core network function component for the control plane connection of the terminal.

Specifically, the access and mobility management function AMF NF component correspondingly processes the control plane connection of the terminal based on any one of the foregoing control plane connection requirement information, to satisfy a requirement for the control plane connection.

Optionally, a specific implementation of step 101 may be: a manner 1: determining, by the core network function component, the information about the requirement of the core network function component for the control plane connection of the terminal based on a service requirement; or a manner 2: obtaining, by the core network function component, a type of a session connection of the terminal, and determining the information about the requirement of the core network function component for the control plane connection of the terminal based on the type of the session connection.

The service requirement specifically means that one or more services need to be completed between the core network function component and the UE. For example, the core network function component sends an SMS message to the UE, and by using the core network function component, a server pushes a message to the UE, and sends a policy configuration service to the UE.

The type of the session connection of the terminal, for example, a type of a session connection carried in a session connection setup request of the terminal, may be obtained in a process in which the terminal sets up a session. The type of the session connection may be an industrial control type, or may be an Internet access type, or certainly may be another type. Descriptions are not provided herein by using examples one by one.

When the core network function component is the SMF NF, specific implementations of the manner 1 and the manner 2 may be as follows:

The manner 1: The determining, by the SMF NF, the information about the requirement of the SMF NF for the control plane connection of the terminal based on a service requirement may specifically include:

when the SMF NF needs to send downlink data to the terminal, if a connection status of the session connection of the terminal is an idle state (SM Idle), determining, by the SMF NF, that the information about the requirement of the SMF NF for the control plane connection of the terminal is the control plane connection activation information (activate CP connection).

Specifically, when the SMF NF needs to send the downlink data to the terminal, if the connection status of the session connection of the terminal is the idle state (SM Idle), the SMF needs to control the control plane connection of the terminal to be in the connected state, and further instruct, by using the control plane connection of the terminal, the terminal to activate the session connection of the terminal, and then the SMF NF determines that the information about the requirement of the SMF NF for the control plane connection of the terminal is the control plane connection activation information (activate CP connection).

Alternatively, if a connection status of the session connection of the terminal is a connected state, and the SMF NF determines that no data is transmitted by using the session connection within preset duration, the SMF NF determines that the information about the requirement of the SMF NF for the control plane connection of the terminal is the control plane connection deactivation information (deactivate CP connection).

Specifically, when the session connection does not need to transmit data, for example, after a time during which no data is transmitted by using the session connection reaches a time that is set in a timer for changing to the idle state, the SMF NF instructs the UE and an access network device serving the UE to set the session connection to be in the idle state. Then, the SMF NF determines that it does not require the control plane connection of the UE to be in the connected state, and may initiate the SMF NF to notify the AMF that it already does not require the control plane connection of the user equipment to be in the connected state. In this case, the information about the requirement of the SMF NF for the control plane connection of the terminal is the control plane connection deactivation information (deactivate CP connection).

Alternatively, after the session connection is released, the SMF NF determines that the information about the requirement of the SMF NF for the control plane connection of the terminal is the information about the requirement for releasing the control plane connection (release the need on CP connection).

Specifically, when the session connection of the UE is not needed any longer, the SMF NF that manages the session connection or the UE triggers release of the session connection. After the SMF NF releases the session connection, the SMF determines that the control plane connection of the UE is not required any longer, that is, the information about the requirement of the SMF NF for the control plane connection of the terminal is the information about the requirement for releasing the control plane connection (release the need on CP connection).

The manner 2: The obtaining, by the SMF NF, a type of a session connection of the terminal, and determining the information about the requirement of the SMF NF for the control plane connection of the terminal based on the type of the session connection may specifically include:

if the type of the session connection is an industrial control type, determining, by the SMF NF, that the information about the requirement of the SMF NF for the control plane connection of the terminal is the information about keeping the control plane connection in the connected state (CP connection always connected).

Specifically, when the session connection of the UE managed by the SMF NF is a session connection of the industrial control type, the SMF NF determines that the control plane connection of the UE needs to be always in the connected state during existence of the session connection. In this case, the information about the requirement of the SMF NF for the control plane connection of the terminal is the information about keeping the control plane connection in the connected state (CP connection always connected).

Alternatively, if the type of the session connection is an Internet (Internet) access type, the SMF NF determines that the information about the requirement of the SMF NF for the control plane connection of the terminal is the information about allowing the terminal to initiate release of the control plane connection (allow CP connection release initiated by UE).

Specifically, a session connection established between a core network and the UE is of the Internet access type, after the session connection is established, the SMF NF that manages the session connection determines that a requirement of the session connection of the UE for the control plane connection of the UE is allowing the user equipment to initiate release of the CP connection. In this case, the information about the requirement of the SMF NF for the control plane connection of the terminal is the information about allowing the terminal to initiate release of the control plane connection (allow CP connection release initiated by UE).

When the core network function component is another core network function component, the following provides descriptions by using a PCF NF as an example, and a specific implementation of the manner 1 may be as follows:

When the PCF NF needs to send a signaling message to the terminal, the PCF NF determines that the information about the requirement of the PCF NF for the control plane connection of the terminal is the control plane connection activation information (activate CP connection).

When the PCF NF has completed service processing on the terminal, the PCF NF determines that the information about the requirement of the PCF NF for the control plane connection of the terminal is the information about the requirement for releasing the control plane connection (release the need on CP connection).

A request message sent by the core network function component to the AMF in cases of different requirements for the control plane connection is a control plane requirement message. The control plane requirement message includes the identifier information of the UE and identifier information of the information about the requirement of the core network function component for the control plane connection of the UE. The identifier information of the information about the requirement of the core network function component for the control plane connection of the UE is used for indicating information about different requirements for the control plane connection. Optionally, the control plane requirement message may further include an identifier of the session connection, an identifier of the SMF NF, indication information of a request reason, and the like. As described above, the identifier information of the information about the requirement of the core network function component for the control plane connection of the UE may indicate: the information about keeping the control plane connection in the connected state (CP connection always connected), the information about allowing the terminal to initiate release of the control plane connection (allow CP connection release initiated by UE), the control plane connection activation information (activate CP connection), the control plane connection deactivation information (deactivate CP connection), and the information about the requirement for releasing the control plane connection (release the need on CP connection).

In another implementation, the control plane requirement message sent by the core network function component to the AMF may be a corresponding separate request message sent based on control plane connection requirement information. Specifically:

1. When the control plane connection requirement information is keeping the control plane connection in the connected state (CP connection always connected), the request message is a request message for keeping the control plane connection in the connected state (for example, request_CP connection_always connect), and the request message may include an identifier of the UE. Optionally, the request message may further include the identifier of the session connection, an identifier of the core network function component, or the indication information of the request reason.

2. When the control plane connection requirement information is allowing the terminal to initiate release of the control plane connection (allow CP connection release initiated by UE), the request message is a request message for allowing the terminal to initiate release of the control plane connection (for example, request_CP connection_allow UE release), and the request message may include the identifier of the UE. Optionally, the request message may further include the identifier of the session connection, the identifier of the core network function component, or the indication information of the request reason.

3. When the control plane connection requirement information is activating the control plane connection (activate CP connection), the request message is a request message for activating the control plane connection (for example, request_CP connection_Activate), and the request message may include the identifier of the UE. Optionally, the request message may further include the identifier of the session connection, the identifier of the core network function component, or the indication information of the request reason.

4. When the control plane connection requirement information is deactivating the control plane connection (deactivate CP connection), the request message is a request message for deactivating the control plane connection (for example, request_CP connection_deactivate), and the request message may include the identifier of the UE. Optionally, the request message may further include the identifier of the session connection, the identifier of the core network function component, or the indication information of the request reason.

5. When the control plane connection requirement information is the information about the requirement for releasing the control plane connection (release the need on CP connection), the request message may be a request message for releasing the control plane connection (for example, request_CP connection_release), and the request message may include the identifier of the UE. Optionally, the request message may further include the identifier of the session connection, the identifier of the core network function component, or the indication information of the request reason.

Descriptions are provided by using a representation form of the control plane connection requirement information as an example. A specific implementation of step 103 may be as follows:

1. When the control plane connection requirement information is the information about keeping the control plane connection in the connected state (CP connection always connected), the AMF NF instructs the UE and an access network device serving the UE to keep the control plane connection of the UE in the connected state (CP connected).

In a specific implementation, if the AMF NF determines, based on the control plane connection requirement information, that the control plane connection of the UE needs to be always in the connected state, the AMF NF does not initiate a change of a state of the control plane connection of the UE into the idle state, and instructs the access network device and the UE to keep connected.

2. When the control plane connection requirement information is the information about allowing the terminal to initiate release of the control plane connection (allow CP connection release initiated by UE), the AMF NF sends, to the UE and an access network AN device serving the UE, an indication message of allowing the terminal to initiate release of the control plane connection. The indication message is used for indicating that the UE is allowed to actively initiate release of the control plane connection.

In a specific implementation, when a trigger condition for entering a control plane connection idle state (for example, the UE does not receive or send data by using an established session connection within a given time of the timer) is satisfied, the UE and the access network AN device serving the UE that receive the indication information trigger the control plane connection to enter the idle state. Similarly, the AMF NF may trigger, based on a condition for triggering the control plane connection of the UE to enter the idle state, the control plane connection of the UE to enter the idle state.

3. When the control plane connection requirement information is the control plane connection activation information (activate CP connection), the AMF NF may execute, based on the control plane connection activation information, a procedure of activating the control plane connection of the terminal, or the AMF NF stores a correspondence between the identifier of the terminal, the identifier of the core network function component, and an identifier of a service connection between the terminal and the core network function component.

A specific implementation in which the AMF NF executes, based on the control plane connection activation information, the procedure of activating the control plane connection of the terminal may include: the AMF NF may determine a current status of the control plane connection of the UE based on related information about the control plane connection of the UE. When the control plane connection of the UE is in the idle state, the AMF NF may perform an operation of paging the UE, so that after receiving a paging message, the UE initiates a procedure of activating the control plane connection, to change the idle state of the control plane connection to the connected state.

Optionally, the AMF NF may further send a response message to an SMF NF or another core network NF that requests to activate the control plane connection of the UE, to indicate that the control plane connection of the UE has already entered the connected state. When the current status of the control plane connection of the UE is already an active state, the AMF NF may directly send the response message to the SMF NF or the another core network NF that requests to activate the control plane connection of the UE, to indicate that the control plane connection of the UE has already entered the connected state.

When the AMF receives the control plane connection activation information, the AMF NF stores the correspondence between the identifier of the terminal, the identifier of the core network function component (such as the PCF NF), and the identifier of the service connection between the terminal and the core network function component. The identifier of the service connection is allocated by the AMF NF. The AMF NF may send the identifier of the service connection to the terminal. When receiving a message sent by the terminal to the core network function component and the identifier of the service connection, the AMF NF determines a corresponding core network function component based on the identifier of the terminal and the identifier of the service connection, and sends the message to the core network function component.

4. When the control plane connection requirement information is the control plane connection deactivation information (deactivate CP connection), the AMF NF may control, based on the control plane connection deactivation information, the control plane connection of the terminal to enter the idle state.

In a specific implementation, the AMF NF may start, based on the control plane connection deactivation information, a timer for the control plane connection of the user equipment to enter the idle state, and further control, when the timer expires, the control plane connection of the user equipment to enter the idle state. Optionally, the AMF NF may further send a response message to the SMF NF or another core network NF that requests to deactivate the control plane connection of the user equipment, to indicate that the request of the SMF NF or the another core network NF has been accepted. Optionally, before the AMF NF controls, based on the control plane connection deactivation information, the control plane connection of the terminal to enter the idle state, the AMF checks and determines whether the another core network NF requests to keep the control plane connection of the user equipment in the connected state: If the another core network NF requests to keep the control plane connection of the user equipment in the connected state, the AMF continues to keep the control plane connection of the user equipment in the connected state; or if no other core network NF requests to keep the control plane connection of the user equipment in the connected state, a step of controlling, based on the control plane connection deactivation information, the control plane connection of the terminal to enter the idle state is performed.

5. When the control plane connection requirement information is the information about the requirement for releasing the control plane connection (Release the need on CP connection), the AMF NF may execute, based on the information about the requirement for releasing the control plane connection, a procedure of releasing the control plane connection of the terminal, or the AMF NF deletes a context configured for the SMF NF or another core network NF that requests to release the control plane connection of the user equipment (when there is also a core network NF that requires the control plane connection to remain connected). The context is used for correctly transmitting a signaling message between the user equipment and the core network NF, for example, a correspondence that is stored in the AMF and that is between a UE ID, an identifier (such as a PDU session ID) of a session connection, and an identifier of the SMF NF that manages the session connection, or a correspondence that is stored in the AMF and that is between a UE ID, an identifier of the core network function component, and an identifier (such as a connection ID) of a service connection between the UE and the core network function component. For example, when the AMF NF receives the information about the requirement for releasing the control plane connection, the AMF checks and determines whether the another core network NF requests to keep the control plane connection of the user equipment in the connected state: If the another core network NF requests to keep the control plane connection of the user equipment in the connected state, the AMF NF deletes the context configured for the SMF NF or the another core network NF that requests to release the control plane connection of the user equipment, and does not execute a procedure of releasing the control plane connection of the terminal; or if no other core network NF requests to keep the control plane connection of the user equipment in the connected state, a procedure of releasing the control plane connection of the terminal is performed based on the information about the requirement for releasing the control plane connection.

In this embodiment, network functions originally fixed and scattered in an MME, an S-GW, and a P-GW are separated into the core network function component and the access and mobility management function AMF NF component. The core network function component determines the information about the requirement of the core network function component for the control plane connection of the terminal, and sends the control plane requirement message to the access and mobility management function AMF NF component. The control plane requirement message includes the information about the requirement of the core network function component for the control plane connection of the terminal. The access and mobility management function AMF NF component processes the control plane connection of the terminal based on the control plane connection requirement information, so that the core network function component notifies the access and mobility management function AMF NF component of the requirement for the control plane connection of the terminal, and the access and mobility management function AMF NF component controls the control plane connection of the terminal based on the requirement of the core network function component, thereby effectively improving flexibility of a network structure while satisfying a network function need.

By using several specific embodiments, the following describes in detail the technical solution in the method embodiment shown in FIG. 2.

Figure 3:
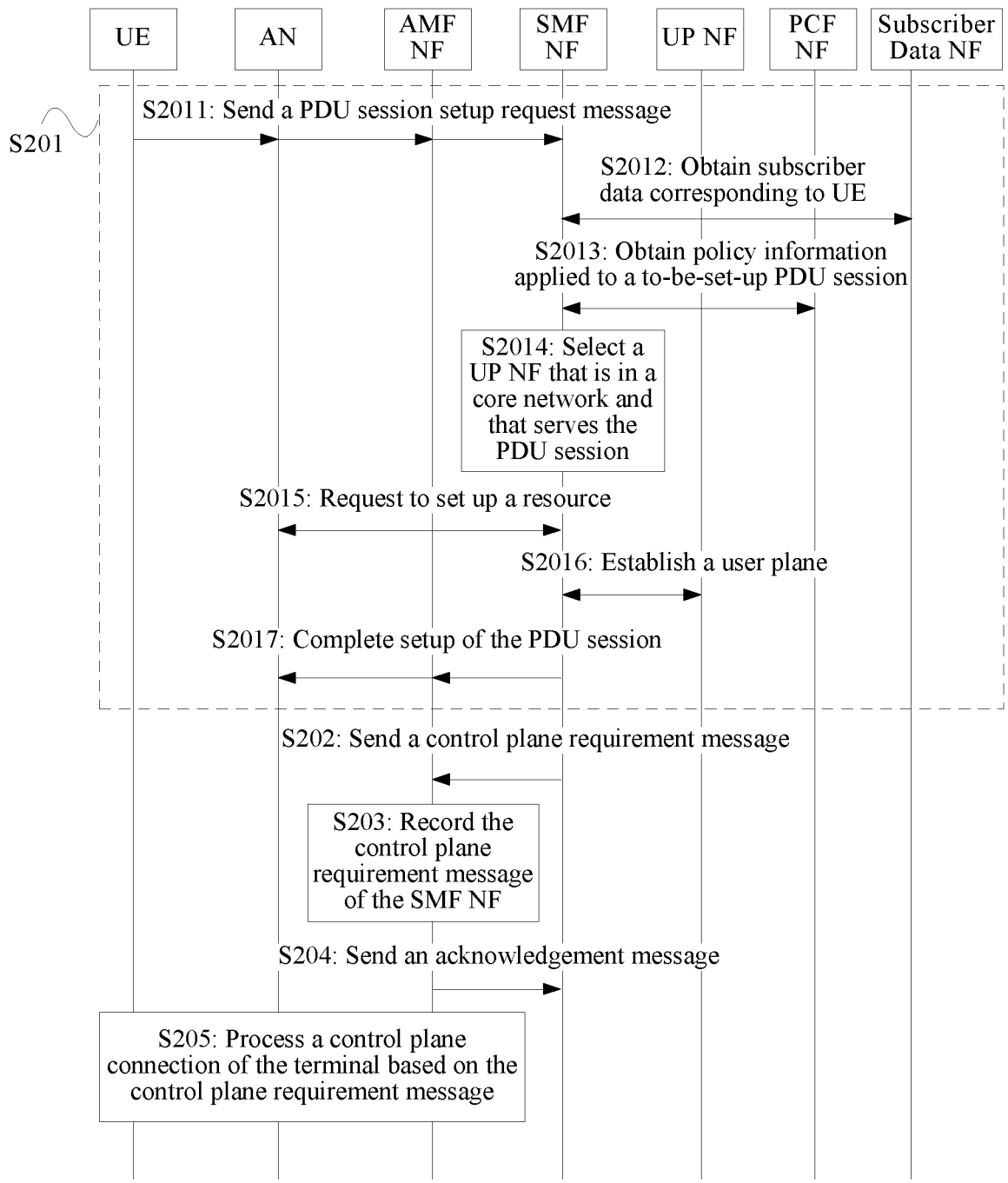
FIG. 3 is a flowchart of another control plane connection management method according to an embodiment of the present application.

FIG. 3 is a flowchart of another control plane connection management method according to an embodiment of the present application. Based on the embodiment shown in FIG. 2, this embodiment is a schematic diagram of a more complete interaction manner. Using an example in which a core network function component is specifically an SMF NF, as shown in FIG. 3, the method in this embodiment may include the following steps.

S201: Set up a PDU session.

S201 may specifically include the following steps.

S2011: UE sends a PDU session setup request (PDU Session Setup Request) message to a network side.

The PDU session setup request message is sent by using an AN and an AMF NF to the SMF NF for processing.

S2012: An SMF NF obtains subscriber data corresponding to the UE from a Subscriber Data NF, determines whether the UE can use a network service of a PDU session connection, and if yes, performs step 2013.

S2013: The SMF NF interacts with a PCF NF to obtain policy information applied to the to-be-set-up PDU session.

The policy information may specifically include quality of service configuration information, charging configuration information, and the like of the PDU session.

S2014: The SMF NF selects a UP NF that is in a core network and that serves the PDU session.

The UP NF may receive, from the AN, data sent by the UE, and further transmit the data to an external public data network DN, and send, to the UE by using the AN, downlink data received from the public data network DN and sent to the UE.

S2015: Request to set up a resource.

Specifically, the SMF NF notifies the AN of the configuration information of the PDU session, so that the AN performs processing for the setup of the PDU session, including enabling the configuration information of the PDU session, allocating a network resource, and the like.

S2016: Establish a user plane.

Specifically, the SMF NF notifies the UP NF of the configuration information of the PDU session, so that the UP NF performs processing for the setup of the PDU session, including enabling the configuration information of the PDU session, allocating a network resource, and the like.

S2017: Complete the setup of the PDU session.

Specifically, the SMF NF notifies the UE of the configuration information of the PDU session by using the AN, and notifies that the setup of the PDU session has been completed.

S202: The SMF NF sends a control plane requirement message to the AMF NF.

For a specific description about S202, refer to the description about step 101. Details are not described herein again.

S203: The AMF NF records the control plane requirement message of the SMF NF.

S204: The AMF NF sends an acknowledgement message to the SMF NF.

S205: The AMF NF processes a control plane connection of the terminal based on the control plane requirement message.

For a specific description about S205, refer to the description about step 103. Details are not described herein again.

In this embodiment, network functions originally fixed and scattered in an MME, an S-GW, and a P-GW are separated into the session management function SMF NF and the access and mobility management function AMF NF. The SMF NF sends the control plane requirement message to the AMF NF, and the AMF NF processes the control plane connection of the terminal based on the control plane requirement message, so that the SMF NF notifies the AMF NF of the requirement for the control plane connection, and the AMF NF controls the control plane connection of the terminal based on the requirement of the SMF NF, thereby effectively improving flexibility of a network structure while satisfying a network function need.

Figure 4:
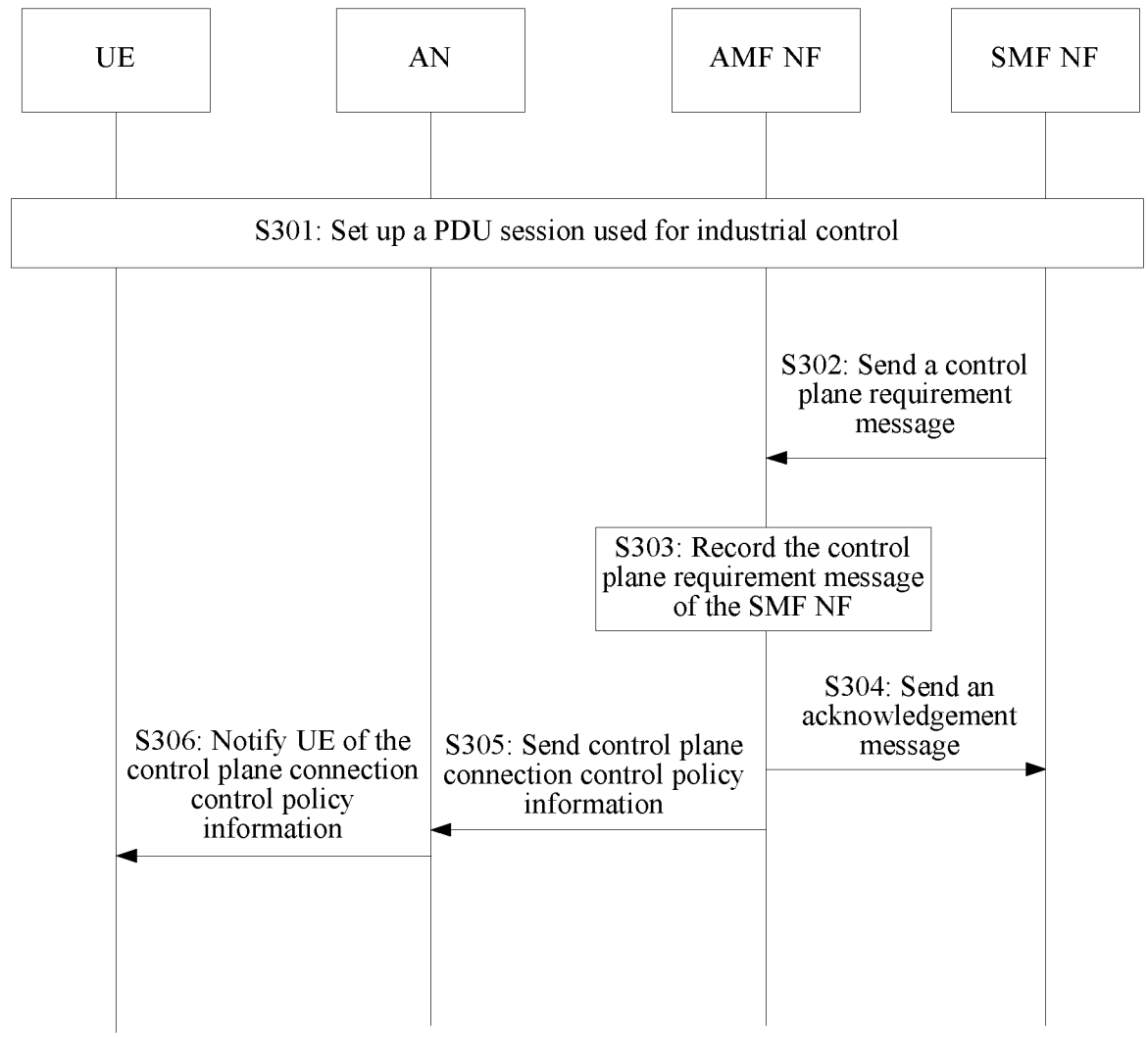
FIG. 4 is a flowchart of another control plane connection management method according to an embodiment of the present application.

FIG. 4 is a flowchart of another control plane connection management method according to an embodiment of the present application. Based on the embodiment shown in FIG. 2, this embodiment is a schematic diagram of an interaction manner in which the control plane connection requirement information is specifically the information about keeping the control plane connection in the connected state (CP connection always connected). As shown in FIG. 4, the method in this embodiment may include the following steps.

S301: Set up a PDU session used for industrial control.

S302: An SMF NF sends a control plane requirement message to an AMF NF.

In S301, the PDU session used for industrial control is set up. Therefore, control plane requirement information in the control plane requirement message in S302 is specifically the information about keeping the control plane connection in the connected state (CP connection always connected).

S303: The AMF NF records the control plane requirement message of the SMF NF.

S304: The AMF NF sends an acknowledgement message to the SMF NF.

S305: The AMF NF sends control plane connection control policy information to an AN.

The AMF NF may determine the control plane connection control policy information based on the control plane requirement message of the SMF NF. The control plane connection control policy information may specifically include indication information of keeping the control plane connection in the connected state.

S306: The AN notifies UE of the control plane connection control policy information.

Based on the indication information of keeping the control plane connection in the connected state, the UE does not actively initiate a request for an operation such as releasing the control plane connection.

In this embodiment, network functions originally fixed and scattered in an MME, an S-GW, and a P-GW are separated into the session management function SMF NF and the access and mobility management function AMF NF. The SMF NF sends the control plane requirement message to the AMF NF, where the control plane requirement information in the control plane requirement message is specifically the information about keeping the control plane connection in the connected state (CP connection always connected), and the AMF NF processes the control plane connection of the terminal based on the information about keeping the control plane connection in the connected state, so that the SMF NF notifies the AMF NF of the requirement for the control plane connection, and the AMF NF controls the control plane connection of the terminal based on the requirement of the SMF NF, thereby effectively improving flexibility of a network structure while satisfying a network function need. In addition, the AMF NF needs to notify the UE of a requirement for keeping the control plane connection in the connected state, so that the UE can be prevented from actively initiating an operation that is not allowed by a network side.

Figure 5:
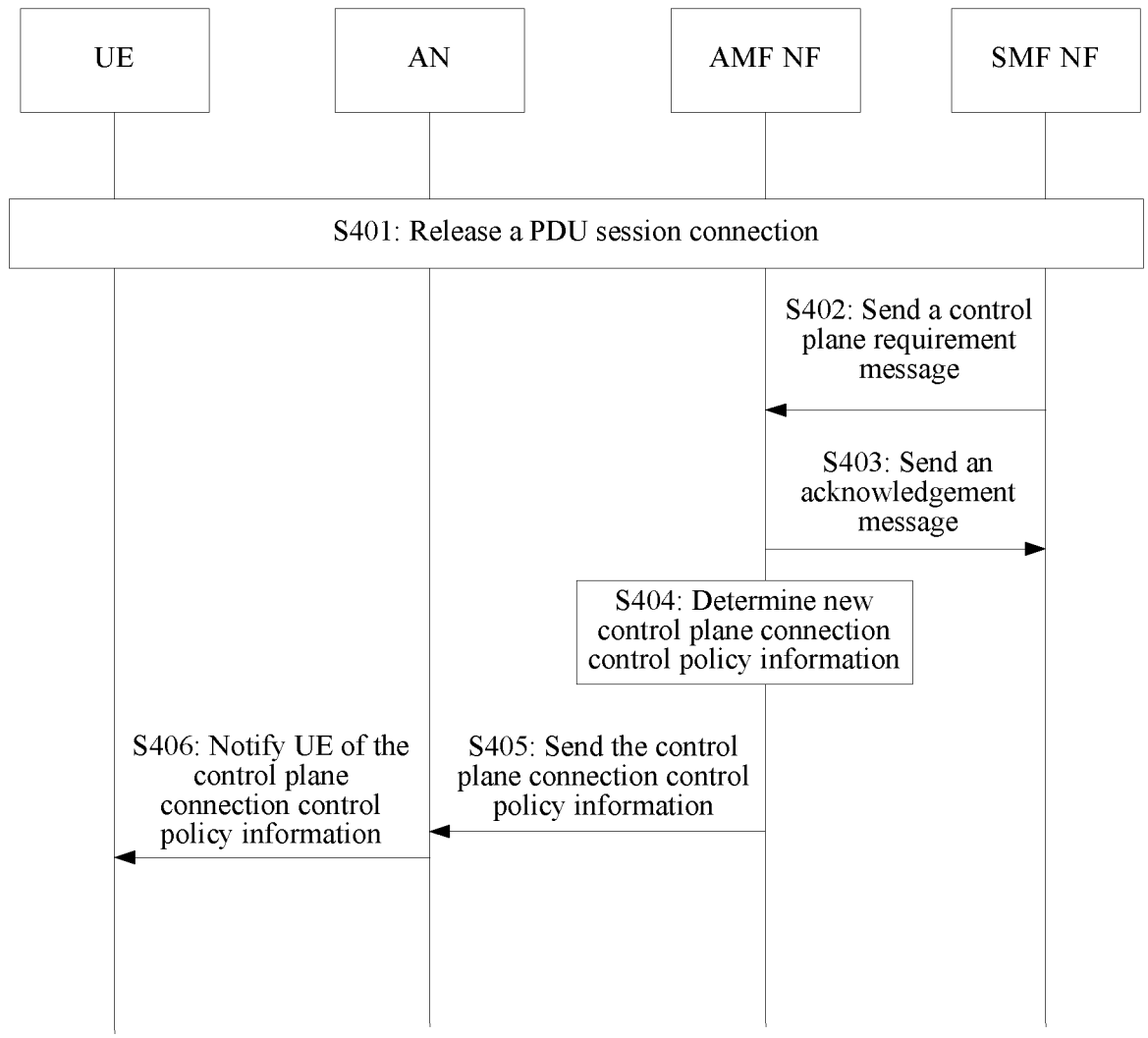
FIG. 5 is a flowchart of another control plane connection management method according to an embodiment of the present application.

FIG. 5 is a flowchart of another control plane connection management method according to an embodiment of the present application. Based on the embodiment shown in FIG. 4, this embodiment is a schematic diagram of an interaction manner in which the requirement for the control plane connection is changed from keeping the control plane connection in the connected state to allowing the terminal to initiate release of the control plane connection. As shown in FIG. 5, the method in this embodiment may include the following steps.

S401: Release a PDU session connection.

S402: An SMF NF sends a control plane requirement message to an AMF NF.

In S401, the PDU session connection is released. Therefore, control plane requirement information in the control plane requirement message in S402 is specifically information about allowing the terminal to initiate release of the control plane connection (allow CP connection release initiated by UE).

S403: The AMF NF sends an acknowledgement message to the SMF NF.

S404: The AMF NF determines new control plane connection control policy information based on the control plane requirement message.

The control plane connection control policy information may be specifically indication information of allowing the terminal to initiate release of the control plane connection.

S405: The AMF NF sends the control plane connection control policy information to an AN.

S406: The AN notifies UE of the control plane connection control policy information.

In this embodiment, network functions originally fixed and scattered in an MME, an S-GW, and a P-GW are separated into the session management function SMF NF and the access and mobility management function AMF NF. The SMF NF sends the control plane requirement message to the AMF NF, where the control plane requirement information in the control plane requirement message is specifically the information about allowing the terminal to initiate release of the control plane connection (allow CP connection release initiated by UE), and the AMF NF processes the control plane connection of the terminal based on the control plane requirement message, so that the SMF NF notifies the AMF NF of the requirement for the control plane connection, and the AMF NF controls the control plane connection of the terminal based on the requirement of the SMF NF, thereby effectively improving flexibility of a network structure while satisfying a network function need.

Figure 6:
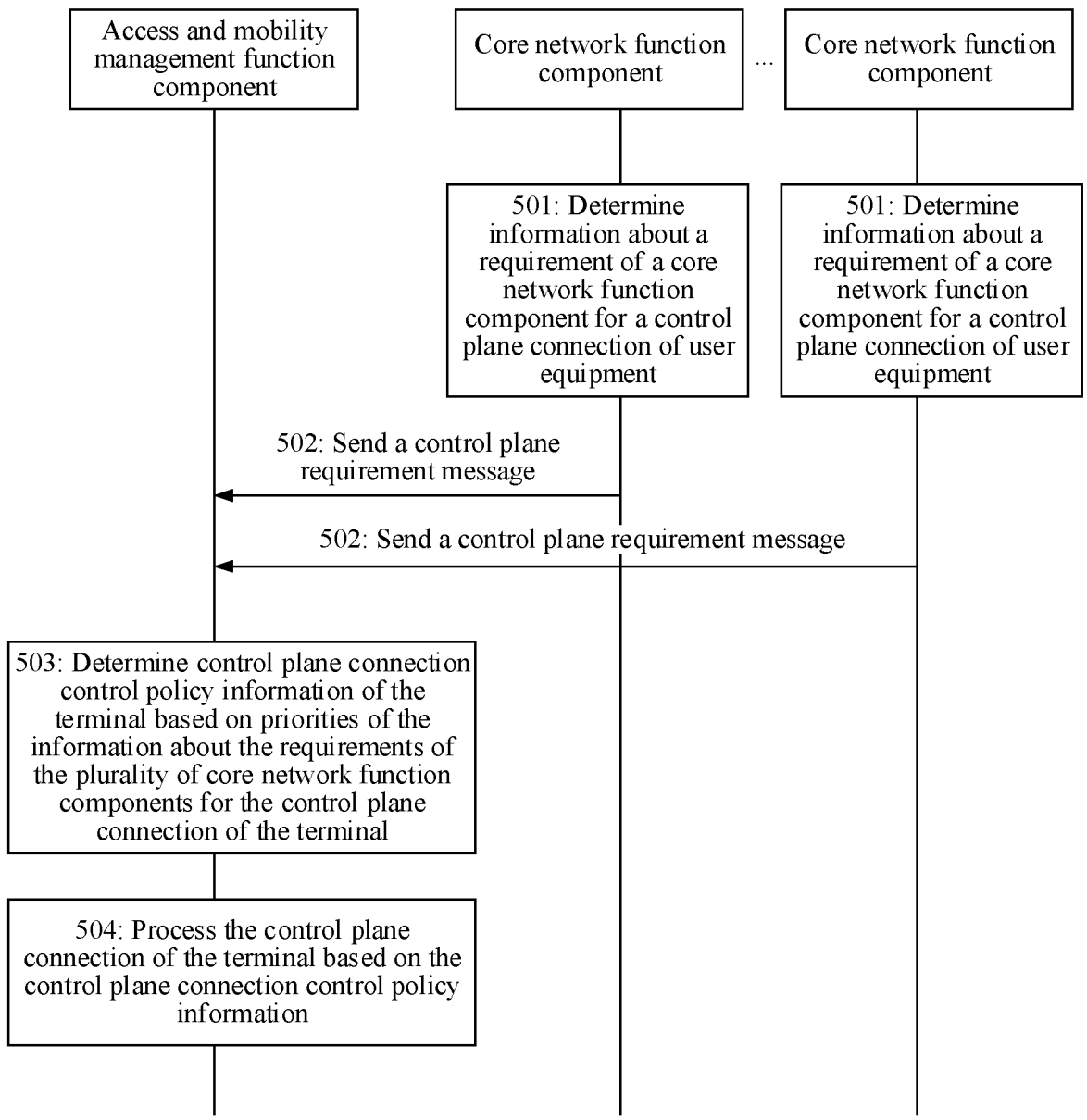
FIG. 6 is a flowchart of another control plane connection management method according to an embodiment of the present application.

FIG. 6 is a flowchart of another control plane connection management method according to an embodiment of the present application. As shown in FIG. 6, based on the embodiments shown in FIG. 2 to FIG. 5, this embodiment relates to a plurality of core network function components. The method in this embodiment may include the following steps.

Step 501: The plurality of core network function components determine information about requirements of the core network function components for a control plane connection of user equipment.

For specific content of the information about the requirements of the core network function components for the control plane connection of the user equipment, and how the plurality of core network function components specifically determine the information about the requirements of the core network function components for the control plane connection of the user equipment, refer to the specific descriptions in the foregoing embodiment shown in FIG. 2. Details are not described herein again. It should be noted that, the information about the requirements of the plurality of core network function components for the control plane connection of the user equipment may be different.

Step 502: The plurality of core network function components send control plane requirement messages to an access and mobility management function component.

For step 502, also refer to the specific descriptions in the foregoing embodiment. Details are not described herein again.

Step 503: The access and mobility management function component determines control plane connection control policy information of the terminal based on priorities of the information about the requirements of the plurality of core network function components for the control plane connection of the terminal.

Specifically, the information about the requirements of the core network function components for the control plane connection of the terminal is: information about keeping the control plane connection in a connected state, information about allowing the terminal to initiate release of the control plane connection, control plane connection activation information, control plane connection deactivation information, and information about a requirement for releasing the control plane connection. Respective corresponding priorities may be flexibly set based on the requirements. In a specific implementation, the priorities respectively corresponding to the information about keeping the control plane connection in the connected state, the information about allowing the terminal to initiate release of the control plane connection, the control plane connection activation information, the control plane connection deactivation information, and the information about the requirement for releasing the control plane connection may be set to be in descending order. The following embodiment specifically describes the implementation in which the priorities are in descending order by using an example.

Specifically, the access and mobility management function component may select, from the received information about the requirements of the plurality of core network function components for the control plane connection of the terminal, control plane connection control policy information corresponding to requirement information having a highest priority as control plane connection control policy information of the terminal.

In an implementation, control plane connection control policy information corresponding to the information about keeping the control plane connection in the connected state is indication information of keeping the control plane connection in the connected state; control plane connection control policy information corresponding to the information about allowing the terminal to initiate release of the control plane connection is indication information of allowing the terminal to initiate release of the control plane connection; control plane connection control policy information corresponding to the control plane connection activation information is control plane connection activation indication information; control plane connection control policy information corresponding to the control plane connection deactivation information is control plane connection deactivation indication information; control plane connection control policy information corresponding to the information about the requirement for releasing the control plane connection is indication information of the requirement for releasing the control plane connection.

Step 504: The access and mobility management function component processes the control plane connection of the terminal based on the control plane connection control policy information.

If the control plane connection control policy information is the indication information of keeping the control plane connection in the connected state, step 504 may specifically include: sending, by the access and mobility management function component, the indication information of keeping the control plane connection in the connected state to the terminal by using an access network device.

If the control plane connection control policy information is the indication information of allowing the terminal to initiate release of the control plane connection, step 504 may specifically include: sending, by the access and mobility management function component, the indication information of allowing the terminal to initiate release of the control plane connection to the terminal and an access network device serving the terminal, where the indication information of allowing the terminal to initiate release of the control plane connection is used for indicating that the terminal is allowed to release the control plane connection of the terminal.

If the control plane connection control policy information is the control plane connection activation indication information, step 504 may specifically include: executing, by the access and mobility management function component based on the control plane connection activation indication information, a procedure of activating the control plane connection of the terminal.

If the control plane connection control policy information is the control plane connection deactivation indication information, step 504 may specifically include: controlling, by the access and mobility management function component based on the control plane connection deactivation indication information, the control plane connection of the terminal to enter an idle state.

If the control plane connection control policy information is the indication information of the requirement for releasing the control plane connection, step 504 may specifically include: executing, by the access and mobility management function component based on the indication information of the requirement for releasing the control plane connection, a procedure of releasing the control plane connection of the terminal.

If the control plane connection control policy information is the control plane connection activation indication information, step 504 may specifically include: storing, by the access and mobility management function component, a correspondence between an identifier of the terminal, identifiers of the core network function components, and an identifier of a service connection between the terminal and the core network function components.

If the control plane connection control policy information is the indication information of the requirement for releasing the control plane connection, step 504 may specifically include: deleting, by the access and mobility management function component, a correspondence between an identifier of the terminal, identifiers of the core network function components, and an identifier of a service connection between the terminal and the core network function components.

In this embodiment, network functions originally fixed and scattered in an MME, an S-GW, and a P-GW are separated into the core network function component and the access and mobility management function AMF NF. The core network function component determines the information about the requirement of the core network function component for the control plane connection of the terminal, and sends the control plane requirement message to the access and mobility management function AMF NF component. The control plane requirement message includes the information about the requirement of the core network function component for the control plane connection of the terminal. The access and mobility management function AMF NF component processes the control plane connection of the terminal based on the control plane connection requirement information, so that the core network function component notifies the access and mobility management function AMF NF component of the requirement for the control plane connection of the terminal, and the access and mobility management function AMF NF component controls the control plane connection of the terminal based on the requirement of the core network function component, thereby effectively improving flexibility of a network structure while satisfying a network function need.

In addition, when the plurality of core network function components provide services to the terminal, the AMF NF may determine the control plane connection control policy information of the terminal based on the information about the requirements of the plurality of core network function components for the control plane connection of the terminal, and process the control plane connection of the terminal based on the control plane connection control policy information, thereby effectively ensuring the connection requirements of the core network function components, and improving quality of service.

Descriptions are provided by using an example in which the plurality of core network function components are a plurality of SMF NFs, and the AMF NF may receive control plane requirement messages sent by the plurality of SMF NFs. That is, the plurality of SMF NFs provide services of different service types to the UE. For example, an SMF NF 1 corresponds to a common Internet access type, and an SMF NF 2 corresponds to an industrial control type. The following provides descriptions by using an example in which two SMF NFs provide services of different service types to the UE. For details about the control plane connection management method in this embodiment of the present application, refer to the descriptions in the following embodiment.

Figure 7:
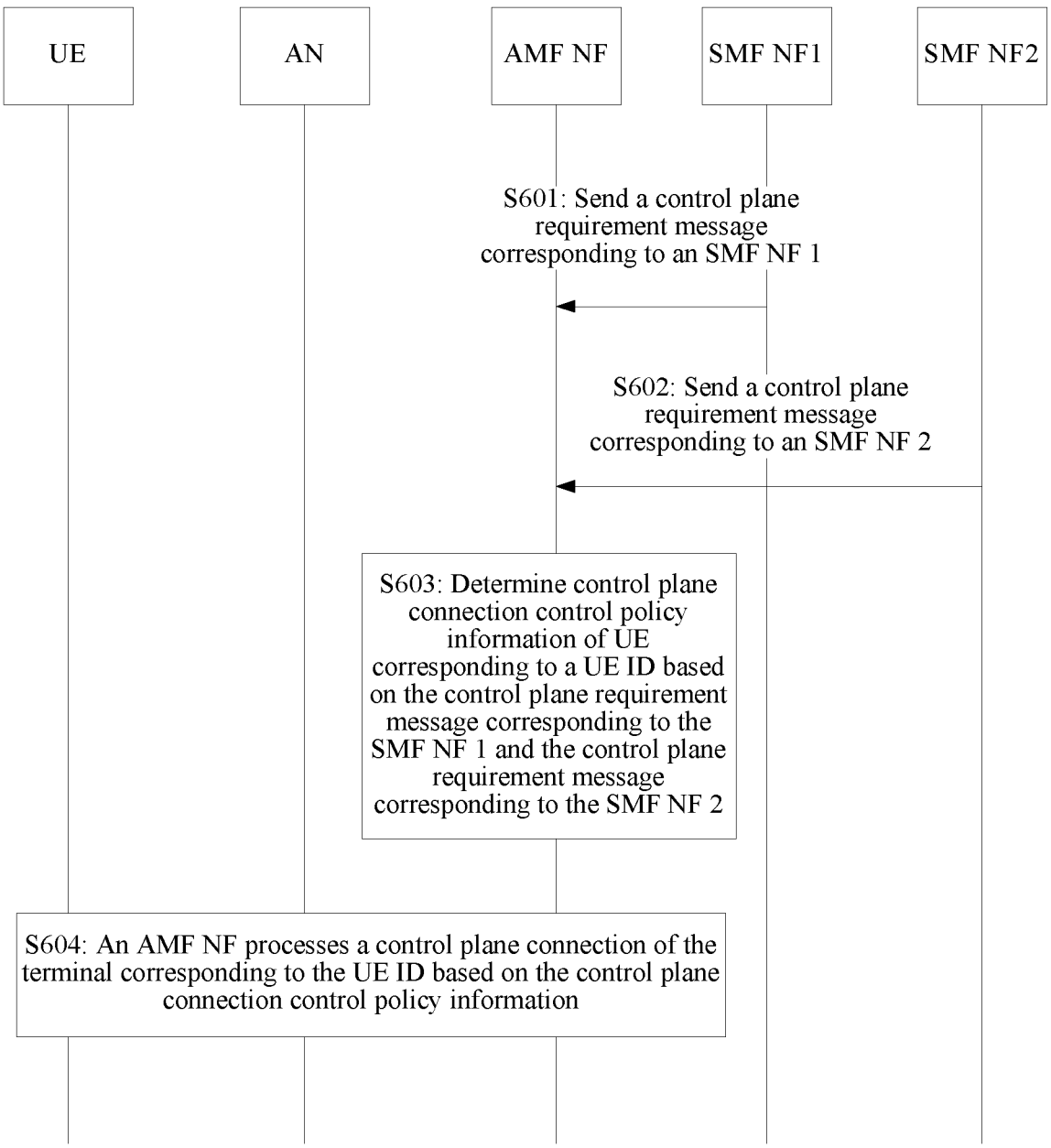
FIG. 7 is a flowchart of another control plane connection management method according to an embodiment of the present application.

FIG. 7 is a flowchart of another control plane connection management method according to an embodiment of the present application. As shown in FIG. 7, a difference between this embodiment and the embodiments shown in FIG. 2 to FIG. 5 lies in that, a plurality of SMF NFs provide services of different service types to UE. The method in this embodiment may include the following steps.

S601: An SMF NF 1 sends a control plane requirement message corresponding to the SMF NF 1 to an AMF NF.

The control plane requirement message corresponding to the SMF NF 1 may specifically include a UE ID, a session ID, an SMF NF 1 ID, and control plane requirement information corresponding to the SMF NF 1.

S602: An SMF NF 2 sends a control plane requirement message corresponding to the SMF NF 2 to the AMF NF.

The control plane requirement message corresponding to the SMF NF 2 may specifically include the UE ID, the session ID, an SMF NF 2 ID, and control plane requirement information corresponding to the SMF NF 2.

S603: The AMF NF determines control plane connection control policy information of UE corresponding to a UE ID based on the control plane requirement message corresponding to the SMF NF 1 and the control plane requirement message corresponding to the SMF NF 2.

The control plane connection control policy information may specifically include any one of indication information of keeping a control plane connection in a connected state, indication information of allowing the terminal to initiate release of the control plane connection, control plane connection activation indication information, control plane connection deactivation indication information, and indication information of a requirement for releasing the control plane connection.

It should be noted that, when the AMF NF receives a control plane requirement message of only one SMF NF that serves the UE, if control plane connection requirement information in the control plane requirement message is information about keeping the control plane connection in the connected state (CP connection always connected), the AMF NF determines that the control plane connection control policy information of the UE is the indication information of keeping the control plane connection in the connected state; if the control plane connection requirement information in the control plane requirement message is information about allowing the terminal to initiate release of the control plane connection (Allow CP connection release initiated by UE), the AMF NF determines that the control plane connection control policy information of the UE is the indication information of allowing the terminal to initiate release of the control plane connection; if the control plane connection requirement information in the control plane requirement message is control plane connection activation information (Activate CP connection), the AMF NF determines that the control plane connection control policy information of the UE is the control plane connection activation indication information; if the control plane connection requirement information in the control plane requirement message is control plane connection deactivation information (Deactivate CP connection), the AMF NF determines that the control plane connection control policy information of the UE is the control plane connection deactivation indication information; or if the control plane connection requirement information in the control plane requirement message is information about the requirement for releasing the control plane connection (Release the need on CP connection), the AMF NF determines that the control plane connection control policy information of the UE is the indication information of the requirement for releasing the control plane connection.

Priorities of the following information in the control plane connection requirement information are in descending order: the information about keeping the control plane connection in the connected state (CP connection always connected), the information about allowing the terminal to initiate release of the control plane connection (Allow CP connection release initiated by UE), the control plane connection activation information (Activate CP connection), the control plane connection deactivation information (Deactivate CP connection), and the information about the requirement for releasing the control plane connection (Release the need on CP connection).

When the AMF NF receives control plane requirement messages from a plurality of SMF NFs that serve the UE, a specific implementation of determining, by the AMF NF based on the control plane requirement messages corresponding to the plurality of SMF NFs, the control plane connection control policy information of the UE corresponding to the UE ID may be: the AMF NF selects, from the received control plane requirement information of the plurality of SMF NFs, control plane connection control policy information corresponding to control plane requirement information having a highest priority as the control plane connection control policy information of the UE corresponding to the UE ID. For example, if the control plane requirement information corresponding to the SMF NF 1 is the information about keeping the control plane connection in the connected state (CP connection always connected), and the control plane requirement information corresponding to the SMF NF 2 is the information about allowing the terminal to initiate release of the control plane connection (Allow CP connection release initiated by UE), the control plane connection control policy information of the UE corresponding to the UE ID is the indication information of keeping the control plane connection in the connected state.

S604: The AMF NF processes a control plane connection of the terminal corresponding to the UE ID based on the control plane connection control policy information.

Optionally, if the control plane connection control policy information is the indication information of keeping the control plane connection in the connected state, the AMF NF may send the control plane connection control policy information to an AN, and then the AN sends the control plane connection control policy information to the UE.

Optionally, after the foregoing steps, if the control plane connection control policy information changes, the method may further include: sending, by the AMF NF, changed control plane connection control policy information to the UE by using the AN.

In this embodiment, network functions originally fixed and scattered in an MME, an S-GW, and a P-GW are separated into the session management function SMF NF and the access and mobility management function AMF NF. The plurality of SMF NFs that serve one UE send the control plane requirement messages to the AMF NF, and the AMF NF determines the control plane connection control policy information of the UE based on the control plane requirement messages of the plurality of SMF NFs, so that the SMF NF notifies the AMF NF of the requirement for the control plane connection, and the AMF NF controls the control plane connection of the terminal based on the requirements of the plurality of SMF NFs, thereby effectively improving flexibility of a network structure while satisfying a network function need.

Figure 8:
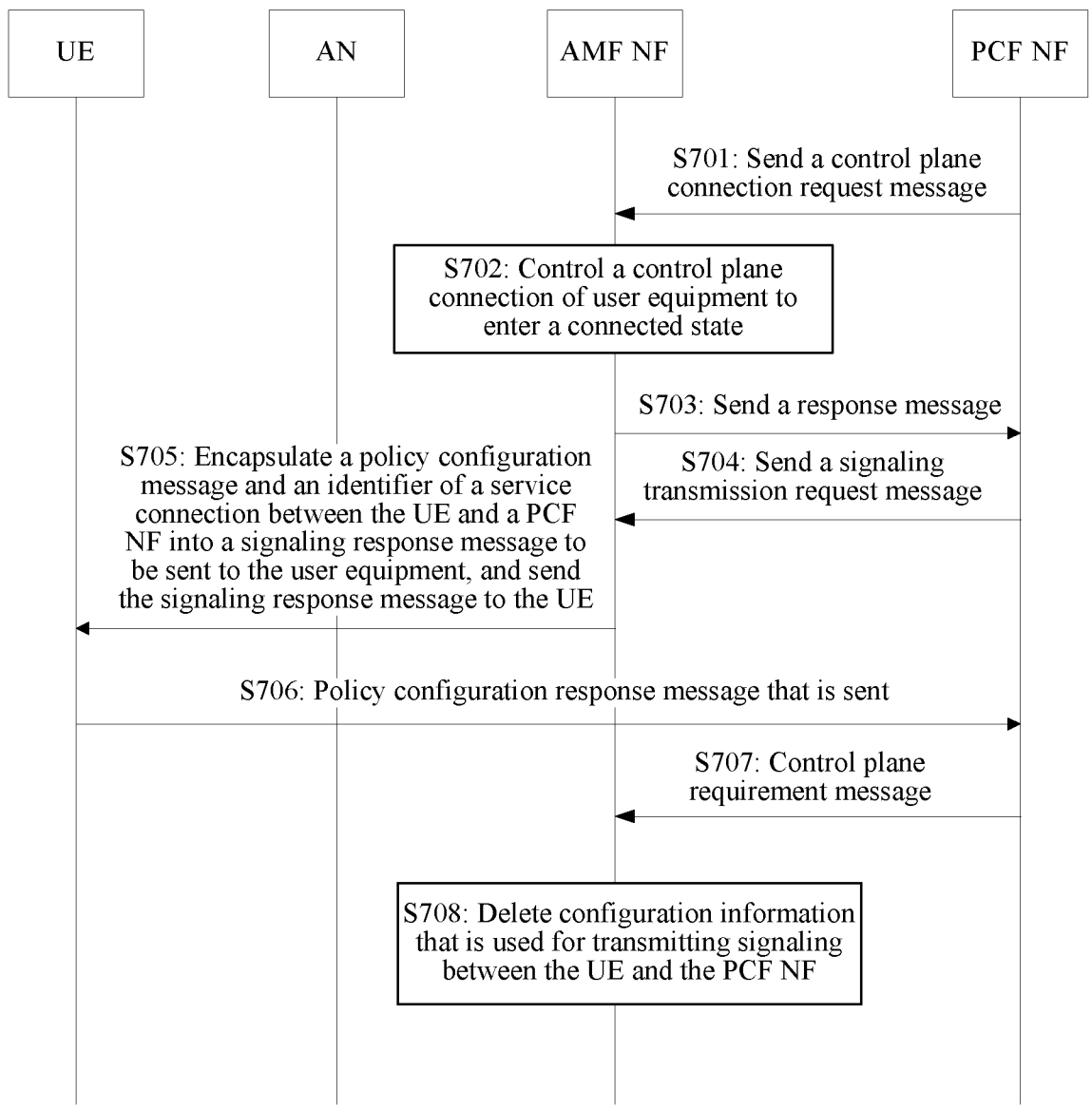
FIG. 8 is a flowchart of another control plane connection management method according to an embodiment of the present application.

Based on the embodiment shown in FIG. 2, FIG. 8 is a flowchart of another control plane connection management method according to an embodiment of the present application. Compared with Embodiment 6, this embodiment is a method process in which a core network NF sends a control plane connection requirement message to an AMF NF when a core network function component needs to interact with UE by using a control plane connection of the UE and send related signaling to the UE. In this embodiment, an implementation method is described by using a PCF NF as an example. Certainly, another core network NF (for example, a capability opening network element or an SMS network element) instead of the PCF NF in the following embodiment may alternatively use the method in this embodiment.

S701: The PCF NF needs to send information about policy configuration to the user equipment, and the PCF NF sends a control plane connection request message to an AMF NF that serves the UE.

The control plane connection request message is used for instructing the AMF to control the control plane connection of the user equipment to enter a connected state. The request message may include an identifier of the UE, identifier information for instructing the AMF to make the control plane connection of the user equipment enter the connected state, identifier information of the PCF NF, and indication information of a request reason (for example, performing policy configuration on the user equipment).

S702: The AMF NF controls a control plane connection of the user equipment to enter a connected state.

Specifically, the AMF NF may determine a current status of the control plane connection of the user equipment based on a status that is of the control plane connection of the user equipment and that is stored in the AMF NF. If the current status is an idle state, the AMF NF initiates an operation of paging the user equipment: The AMF NF sends a paging message to an access network AN of a network area in which the user equipment is located, the access network AN sends the paging message through broadcasting, and after receiving the paging message, the user equipment interacts with the AMF NF by using the access network, and makes the control plane connection of the user equipment enter the connected state.

S703: The AMF NF sends a response message to the PCF NF.

The response message is used for indicating that the control plane connection of the user equipment has already entered the connected state.

Optionally, the AMF NF may further store configuration information used for transmitting signaling between the user equipment and the PCF NF. The configuration information is used by the AMF NF to correctly transmit, to the PCF NF, signaling sent by the user equipment to the PCF. The configuration information may specifically include an identifier of the user equipment, an identifier of the PCF NF, and an identifier (Connection ID) used for identifying a service connection between the UE and the PCF NF. The identifier of the service connection may be allocated by the AMF NF, and the AMF NF may provide the identifier of the service connection to the user equipment when the PCF NF sends a signaling message to the user equipment. Further, a signaling message sent by the user equipment to the PCF NF by using the AMF NF include a connection ID, so that the AMF NF can determine the identifier of the PCF NF based on the UE ID and the connection ID in the signaling message and the configuration information that is used for transmitting the signaling between the user equipment and the PCF NF and that is stored in the AMF NF, and further transmit the signaling message to the PCF NF.

S704: The PCF NF sends a signaling transmission request message to the AMF NF.

The signaling transmission request includes the identifier of the UE and a policy configuration message of the user equipment.

S705: The AMF NF encapsulates a policy configuration message and an identifier of a service connection between the UE and the PCF NF into a signaling response message to be sent to the user equipment, and sends the signaling response message to the user equipment by using the control plane connection between the UE and the AMF NF.

Optionally, in the method in this embodiment, the following steps may be further performed.

S706: The PCF NF receives a policy configuration response message sent by the user equipment.

The policy configuration response message is used for notifying that a policy configuration service of the user equipment is successfully completed.

S707: The PCF NF determines that the control plane connection of the UE provided by the AMF NF is not required, and the PCF NF sends a control plane requirement message of the UE to the AMF NF.

The control plane requirement message may include the identifier of the UE, indication information of releasing the control plane connection (Release the need on CP connection), and the identifier of the PCF NF.

S708: The AMF deletes configuration information that is used for transmitting signaling between the user equipment and the PCF NF and that is stored in the AMF, and sends a response message to the PCF NF.

The response message is used for notifying the PCF NF that control plane connection processing requested by the PCF NF has already been completed.

Figure 9:
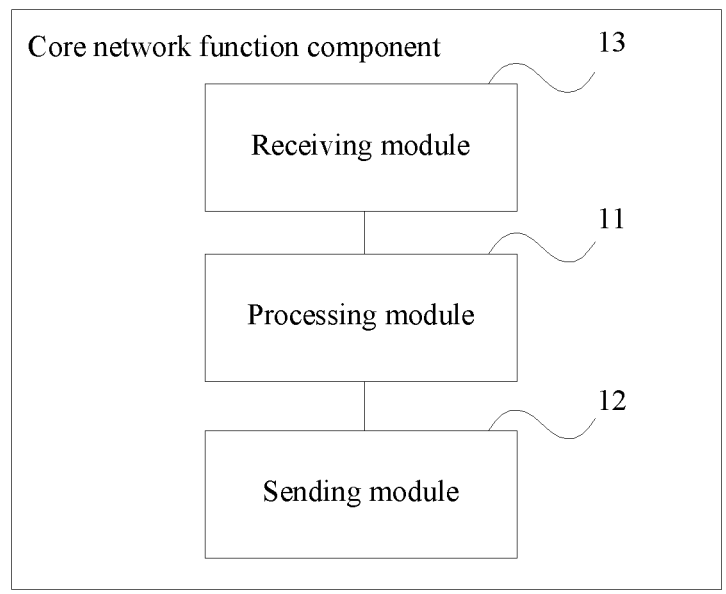
FIG. 9 is a schematic structural diagram of a core network function component according to an embodiment of the present application.

FIG. 9 is a schematic structural diagram of a core network function component according to an embodiment of the present application. As shown in FIG. 9, the apparatus in this embodiment may include a processing module 11 and a sending module 12. The processing module 11 is configured to determine information about a requirement of the core network function component for a control plane connection of a terminal. The sending module 12 is configured to send a control plane requirement message to an access and mobility management function component, where the control plane requirement message includes identifier information of the terminal and the information about the requirement of the core network function component for the control plane connection of the terminal, and the control plane requirement message is used for instructing the access and mobility management function component to process the control plane connection of the terminal.

Optionally, the information about the requirement of the core network function component for the control plane connection of the terminal includes any one of information about keeping the control plane connection in a connected state, information about allowing the terminal to initiate release of the control plane connection, control plane connection activation information, control plane connection deactivation information, and information about a requirement for releasing the control plane connection.

Optionally, the processing module 11 being configured to determine information about a requirement of the core network function component for a control plane connection of a terminal includes: determining the information about the requirement of the core network function component for the control plane connection of the terminal based on a service requirement; or obtaining a type of a session connection of the terminal, and determining the information about the requirement of the core network function component for the control plane connection of the terminal based on the type of the session connection.

Optionally, the core network function component includes a session management function component, and the processing module 11 being configured to determine the information about the requirement of the core network function component for the control plane connection of the terminal based on the type of the session connection includes: if the type of the session connection is an industrial control type, determining that the information about the requirement of the session management function component for the control plane connection of the terminal is the information about keeping the control plane connection in the connected state; or if the type of the session connection is an Internet access type, determining that the information about the requirement of the session management function component for the control plane connection of the terminal is the information about allowing the terminal to initiate release of the control plane connection.

Optionally, the core network function component includes a session management function component, and the processing module 11 being configured to determine the information about the requirement of the core network function component for the control plane connection of the terminal based on a service requirement includes: when the session management function component needs to send downlink data to the terminal, if a connection status of the session connection of the terminal is an idle state, determining that the information about the requirement of the session management function component for the control plane connection of the terminal is the control plane connection activation information.

Optionally, the core network function component includes a session management function component, and the processing module 11 being configured to determine the information about the requirement of the core network function component for the control plane connection of the terminal based on a service requirement includes: if a connection status of the session connection of the terminal is a connected state, and the session management function component determines that no data is transmitted by using the session connection within preset duration, determining that the information about the requirement of the session management function component for the control plane connection of the terminal is the control plane connection deactivation information.

Optionally, the core network function component includes a session management function component, and the processing module 11 being configured to determine the information about the requirement of the core network function component for the control plane connection of the terminal based on the type of the session connection includes: after the session connection is released, determining that the information about the requirement of the session management function component for the control plane connection of the terminal is the information about the requirement for releasing the control plane connection.

Optionally, the processing module 11 being configured to determine the information about the requirement of the core network function component for the control plane connection of the terminal based on a service requirement includes: when the core network function component needs to send a signaling message to the terminal, determining that the information about the requirement of the core network function component for the control plane connection of the terminal is the control plane connection activation information.

Optionally, the processing module 11 being configured to determine the information about the requirement of the core network function component for the control plane connection of the terminal based on a service requirement includes: when the core network function component has completed service processing on the terminal, determining that the information about the requirement of the core network function component for the control plane connection of the terminal is the information about the requirement for releasing the control plane connection.

Optionally, the apparatus in this embodiment of the present application may further include a receiving module 13, and the receiving module 13 may be configured to receive a message sent by another function module. Optionally, the apparatus in this embodiment of the present application may further include a storage module, and the storage module is configured to store program code and data of the core network function component.

The apparatus in this embodiment may be configured to execute the technical solution of the foregoing method embodiment. An implementation principle and a technical effect of the apparatus are similar to those of the foregoing method embodiment. Details are not described herein again.

Figure 10:
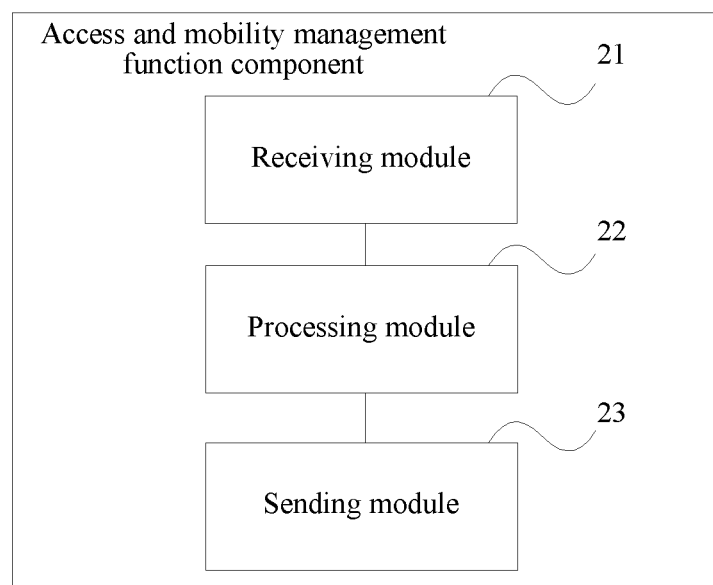
FIG. 10 is a schematic structural diagram of an access and mobility management function component according to an embodiment of the present application.

FIG. 10 is a schematic structural diagram of an access and mobility management function component according to an embodiment of the present application. As shown in FIG. 10, the apparatus in this embodiment may include a receiving module 21 and a processing module 22. The receiving module 21 is configured to receive a control plane requirement message sent by a core network function component, where the control plane requirement message includes identifier information of a terminal and information about a requirement of the core network function component for a control plane connection of the terminal. The processing module 22 is configured to process the control plane connection of the terminal based on the information about the requirement of the core network function component for the control plane connection of the terminal.

Optionally, the information about the requirement of the core network function component for the control plane connection of the terminal includes any one of information about keeping the control plane connection in a connected state, information about allowing the terminal to initiate release of the control plane connection, control plane connection activation information, control plane connection deactivation information, and information about a requirement for releasing the control plane connection.

Optionally, the core network function component includes a plurality of core network function components, and the receiving module 21 being configured to receive a control plane requirement message sent by a core network function component includes: separately receiving, by the receiving module 21, control plane requirement messages sent by the plurality of core network function components; and the processing module 22 being configured to process a control plane of the terminal based on the information about the requirement of the core network function component for the control plane connection of the terminal includes: the processing module 22 being configured to determine control plane connection control policy information of the terminal based on priorities of information about requirements of the plurality of core network function components for the control plane connection of the terminal; and the processing module 22 being configured to process the control plane connection of the terminal based on the control plane connection control policy information.

Optionally, priorities corresponding to the information about keeping the control plane connection in the connected state, the information about allowing the terminal to initiate release of the control plane connection, the control plane connection activation information, the control plane connection deactivation information, and the information about the requirement for releasing the control plane connection are in descending order.

Optionally, if the control plane connection control policy information is indication information of keeping the control plane connection in the connected state, the processing module 22 being configured to process the control plane connection of the terminal based on the control plane connection control policy information includes: sending the indication information of keeping the control plane connection in the connected state to the terminal by using an access network device. Specifically, the processing module 22 invokes a sending module 23 to send the indication information of keeping the control plane connection in the connected state.

Optionally, if the control plane connection control policy information is indication information of allowing the terminal to initiate release of the control plane connection, the processing module 22 being configured to process the control plane connection of the terminal based on the control plane connection control policy information includes: the processing module 22 being configured to send, by using the sending module, the indication information of allowing the terminal to initiate release of the control plane connection to the terminal and an access network device serving the terminal, where the indication information of allowing the terminal to initiate release of the control plane connection is used for indicating that the terminal is allowed to initiate release of the control plane connection of the terminal.

Optionally, if the control plane connection control policy information is control plane connection activation indication information, the processing module 22 being configured to process the control plane connection of the terminal based on the control plane connection control policy information includes: executing, based on the control plane connection activation indication information, a procedure of activating the control plane connection of the terminal.

Optionally, if the control plane connection control policy information is control plane connection deactivation indication information, the processing module 22 being configured to process the control plane connection of the terminal based on the control plane connection control policy information includes: controlling, based on the control plane connection deactivation indication information, the control plane connection of the terminal to enter an idle state.

Optionally, if the control plane connection control policy information is indication information of the requirement for releasing the control plane connection, the processing module 22 being configured to process the control plane connection of the terminal based on the control plane connection control policy information includes: executing, based on the indication information of the requirement for releasing the control plane connection, a procedure of releasing the control plane connection of the terminal.

Optionally, if the control plane connection control policy information is indication information of the requirement for releasing the control plane connection, the processing module 22 being configured to process the control plane connection of the terminal based on the control plane connection control policy information includes: deleting a correspondence between the identifier information of the terminal, an identifier of a session connection, and an identifier of the core network function component.

Optionally, if the control plane connection control policy information changes, the access and mobility management function component further includes the sending module 23. The processing module 22 invokes the sending module 23 to send changed control plane connection control policy information to the terminal by using an access network.

Optionally, if the control plane connection control policy information is control plane connection activation indication information, the processing module 22 being configured to process the control plane connection of the terminal based on the control plane connection control policy information includes: storing a correspondence between the identifier information of the terminal, an identifier of the core network function component, and an identifier of a service connection between the terminal and the core network function component.

Optionally, the sending module 23 is further configured to send the identifier of the service connection to the terminal. The receiving module 21 is further configured to: when receiving a message sent by the terminal to the core network function component and the identifier of the service connection, determine a corresponding core network function component based on the identifier of the terminal and the identifier of the service connection, and send the message to the core network function component.

Optionally, if the control plane connection control policy information is indication information of the requirement for releasing the control plane connection, the processing module 22 being configured to process the control plane connection of the terminal based on the control plane connection control policy information includes: deleting a correspondence between the identifier information of the terminal, an identifier of the core network function component, and an identifier of a service connection between the terminal and the core network function component.

Optionally, the apparatus in this embodiment of the present application may further include a storage module, and the storage module is configured to store program code and data of the access and mobility management function component.

The apparatus in this embodiment may be configured to execute the technical solution of the foregoing method embodiment. An implementation principle and a technical effect of the apparatus are similar to those of the foregoing method embodiment. Details are not described herein again.

It should be noted that, the core network function component in the embodiment shown in FIG. 9 may correspond to a physical device that has the same functions, for example, a core network function entity. The sending module 12 in this embodiment of the present application may correspond to a transmitter of the core network function entity, or may correspond to a transceiver of the core network function entity. The core network function component may further include a receiving module. The receiving module may correspond to a receiver of the core network function entity, or may correspond to the transceiver of the core network function entity. The processing module 11 may correspond to a processor of the core network function entity. Herein, the processor may be a central processing unit (CPU), or an application-specific integrated circuit (ASIC), or one or more integrated circuits that complete implementation of this embodiment of the present application. The core network function entity may further include a memory. The memory is configured to store instruction code, and the processor invokes the instruction code in the memory, to control the sending module 12 and the processing module 11 in this embodiment of the present application to perform the foregoing operations.

It should be noted that, the access and mobility management function component in the embodiment shown in FIG. 10 may correspond to a physical device that has the same functions, for example, an access and mobility management function entity. The sending module 23 in this embodiment of the present application may correspond to a transmitter of the access and mobility management function entity, or may correspond to a transceiver of the access and mobility management function entity. The receiving module 21 may correspond to a receiver of the access and mobility management function entity, or may correspond to the transceiver of the access and mobility management function entity. The processing module 22 may correspond to a processor of the access and mobility management function entity. Herein, the processor may be a CPU, or an ASIC, or one or more integrated circuits that complete implementation of this embodiment of the present application. The access and mobility management function entity may further include a memory. The memory is configured to store instruction code, and the processor invokes the instruction code in the memory, to control the sending module 23 and the receiving module 21 in this embodiment of the present application to perform the foregoing operations.

When at least some functions of the control plane connection management method in the embodiments of the present application are implemented by using software, an embodiment of the present application further provides a computer readable storage medium. The computer readable storage medium is configured to store a computer software instruction used by the core network function component. When the computer software instruction is run on a computer, the computer is enabled to perform the various possible control plane connection management methods in the foregoing method embodiments. When the computer executable instruction is loaded and executed on the computer, some or all of the procedures or functions in the embodiments of the present application may be generated. The computer instruction may be stored in the computer readable storage medium, or transmitted from one computer readable storage medium to another computer readable storage medium. For the transmission, the computer instruction may be transmitted to another website, computer, server, or data center in a wireless manner (for example, cellular communication, infrared, short distance radio, or microwave). The computer readable storage medium may be any usable medium accessible by the computer, or a data storage device, such as a server or a data center, integrating one or more usable media. The usable medium may be a magnetic medium (for example, a soft disk, a hard disk, or a magnetic tape), an optical medium (for example, a DVD), a semiconductor medium (for example, a solid state disk Solid State Disk (SSD)), or the like.

When at least some functions of the control plane connection management method in the embodiments of the present application are implemented by using software, an embodiment of the present application further provides a computer readable storage medium. The computer readable storage medium is configured to store a computer software instruction used by the access and mobility management function component. When the computer software instruction is run on a computer, the computer is enabled to perform the various possible control plane connection management methods in the foregoing method embodiments. When the computer executable instruction is loaded and executed on the computer, some or all of the procedures or functions in the embodiments of the present application may be generated. The computer instruction may be stored in the computer readable storage medium, or transmitted from one computer readable storage medium to another computer readable storage medium. For the transmission, the computer instruction may be transmitted to another website, computer, server, or data center in a wireless manner (for example, cellular communication, infrared, short distance radio, or microwave). The computer readable storage medium may be any usable medium accessible by the computer, or a data storage device, such as a server or a data center, integrating one or more usable media. The usable medium may be a magnetic medium (for example, a soft disk, a hard disk, or a magnetic tape), an optical medium (for example, a DVD), or a semiconductor medium (for example, an SSD).

In addition, an embodiment of the present application further provides a computer program product including an instruction, that is, a software product. When the computer program product is run on a computer, the computer is enabled to perform the various possible control plane connection management methods in the foregoing method embodiments. An implementation principle and a technical effect of the computer program product are similar to those of the foregoing method embodiments. Details are not described herein again.

Finally, it should be noted that the foregoing embodiments are merely intended for describing the technical solutions of this application other than limiting this application. Although this application is described in detail with reference to the foregoing embodiments, persons of ordinary skill in the art should understand that they may still make modifications to the technical solutions described in the foregoing embodiments or make equivalent replacements to some or all technical features thereof, without departing from the scope of the technical solutions of the embodiments of the present application.

What is claimed is:

1. A control plane connection management method comprising:
    sending, by a core network function entity, a first control plane requirement message to an access and mobility management function entity, wherein the first control plane requirement message comprises identifier information of a terminal and information about a first connection requirement, and is for instructing the access and mobility management function entity to activate a control plane connection of the terminal between the terminal and the access and mobility management function entity; and
    receiving, by the core network function component, a response message from the access and mobility management function entity, wherein the response message indicates that the control plane connection of the terminal has already entered a connected state.

2. The method according to claim 1, wherein the method further comprises:
    when the core network function entity has completed the service,
    sending, by the core network function entity, a second control plane requirement message to the access and mobility management function entity, wherein the second control plane requirement message comprises information about a second connection requirement for the control plane connection of the terminal, and is for instructing the access and mobility management function entity to release the control plane connection of the terminal.

3. The method according to claim 1, wherein the method further comprises:
    activating, by the access and mobility management function entity, the control plane connection of the terminal based on the information about the first connection requirement.

4. The method according to claim 2, wherein the method further comprises:
    releasing, by the access and mobility management function entity, the control plane connection of the terminal based on the information about the second connection requirement.

5. The method according to claim 1, wherein the step of sending the first control plane requirement message comprises:
sending, by the core network function entity, the first control plane requirement message to the access and mobility management function entity based on a service requirement, wherein the service requirement is sending a short message service (SMS) message to the terminal.

6. A control plane connection management method performed by an access and mobility management entity, comprising:
receiving a first control plane requirement message from a core network function entity, wherein the first control plane requirement message comprises identifier information of a terminal and information about a first connection requirement for a control plane connection of the terminal, wherein the first connection requirement is for activating the control plane connection between the terminal and the access and mobility management function entity;
activating the control plane connection of the terminal based on the information about the first connection requirement; and
sending a response message to the core network function entity, wherein the response message indicates that the control plane connection of the terminal has already entered a connected state.

7. The method according to claim 6, further comprising:
receiving a second control plane requirement message from the core network function entity, wherein the second control plane requirement message comprises information about a second connection requirement for the control plane connection of the terminal, and the second connection requirement is for releasing the control plane connection of the terminal; and
releasing the control plane connection of the terminal based on the information about the second connection requirement.

8. The method according to claim 6, wherein the core network function entity is a short message service (SMS) network element.

9. A core network function entity, comprising:
a memory storing instructions; and
a processor coupled to the memory and configured to execute the instructions stored in the memory to:
send a first control plane requirement message to an access and mobility management function entity, wherein the first control plane requirement message comprises identifier information of a terminal and information about a first connection requirement, and is for instructing the access and mobility management function entity to activate a control plane connection of the terminal between the terminal and the access and mobility management function entity; and
receive a response message from the access and mobility management function entity, wherein the response message indicates that the control plane connection of the terminal has already entered a connected state.

10. The core network function entity according to claim 9, wherein the processor is further configured to:
when the service is completed,
send a second control plane requirement message to the access and mobility management function entity, wherein the second control plane requirement message comprises information about a second connection requirement for the control plane connection of the terminal, and is for instructing the access and mobility management function entity to release the control plane connection of the terminal.

11. The core network function entity according to claim 9, wherein the core network function entity is a short message service (SMS) network element, and the processor is further configured to:
send the first control plane requirement message to the access and mobility management function entity based on a service requirement, wherein the service requirement is sending an SMS message to the terminal.

12. An access and mobility management function entity, comprising:
a memory storing instructions; and
a processor coupled to the memory and configured to execute the instructions stored in the memory to:
receive a first control plane requirement message from a core network function entity, wherein the first control plane requirement message comprises identifier information of a terminal and information about a first connection requirement for a control plane connection of a terminal, wherein the first connection requirement is for activating the control plane connection between the terminal and the access and mobility management function component;
activate the control plane connection of the terminal based on the information about the first connection requirement; and
send a response message to the core network function entity, wherein the response message indicates that the control plane connection of the terminal has already entered a connected state.

13. The access and mobility management function entity according to claim 12, wherein the processor is further configured to:
receive a second control plane requirement message from the core network function entity, wherein the second control plane requirement message comprises information about a second connection requirement for the control plane connection of the terminal, and the second connection requirement is for releasing the control plane connection; and
release the control plane connection of the terminal based on the information about the second connection requirement.

14. A system comprising:
a core network function entity; and
an access and mobility management function entity,
the core network function entity being configured to send a first control plane requirement message to the access and mobility management function entity, wherein the first control plane requirement message comprises identifier information of a terminal and information about a first connection requirement; and receive a response message from the access and mobility management function entity, wherein the response message indicates that the control plane connection of the terminal has already entered a connected state;
the access and mobility management function entity being configured to activate the control plane connection of the terminal based on the information about the first connection requirement and send the response message to the core network function entity.

15. The system according to claim 14, wherein
the core network function entity is further configured to send a second control plane requirement message to the access and mobility management function entity when the service is completed, wherein the second control plane requirement message comprises information about a second connection requirement for the control plane connection of the terminal; and the access and mobility management function entity is further configured to release the control plane connection of the terminal based on the information about the second connection requirement.

16. The method according to claim 1, wherein the core network function entity is a short message service (SMS) network element.

17. The access and mobility management function entity according to claim 12, wherein the core network function entity is a short message service (SMS) network element.

18. The system according to claim 14, wherein the core network function entity is a short message service (SMS) network element.

19. The system according to claim 14, wherein the core network function entity is further configured to:

send the first control plane requirement message to the access and mobility management function entity based on a service requirement, wherein the service requirement is sending an SMS message to the terminal.

* * * * *